(12) United States Patent
Moiddin et al.

(10) Patent No.: US 11,445,657 B2
(45) Date of Patent: Sep. 20, 2022

(54) SAPLING PLANTING APPARATUS

(71) Applicant: DEERE & COMPANY, Moline, IL (US)

(72) Inventors: Syed Gouse Moiddin, Hyderabad (IN); Pramod Kumar Sahu, Bhubaneswar (IN); Abhishek Wangikar, Mumbai (IN); Rahul Chourey, Nasik (IN)

(73) Assignee: Deere & Company, Moline, IL (US)

( * ) Notice: Subject to any disclaimer, the term of this patent is extended or adjusted under 35 U.S.C. 154(b) by 427 days.

(21) Appl. No.: 16/511,918

(22) Filed: Jul. 15, 2019

(65) Prior Publication Data
US 2021/0015025 A1    Jan. 21, 2021

(51) Int. Cl.
*A01C 5/04* (2006.01)
*A01C 11/00* (2006.01)
*A01B 79/02* (2006.01)

(52) U.S. Cl.
CPC .............. *A01C 5/04* (2013.01); *A01B 79/02* (2013.01); *A01C 11/006* (2013.01)

(58) Field of Classification Search
CPC ......... A01C 5/04; A01C 11/006; A01C 11/02; A01C 11/025; A01B 79/02
See application file for complete search history.

(56) References Cited

U.S. PATENT DOCUMENTS

| | | | |
|---|---|---|---|
| 3,943,863 A | 3/1976 | Leonard et al. | |
| 3,972,294 A | 8/1976 | Grundstrom et al. | |
| 4,273,056 A | 6/1981 | Loefgren et al. | |
| 4,569,400 A * | 2/1986 | Minagawa | A01C 5/04 172/101 |
| 4,637,328 A * | 1/1987 | Topham | A01C 5/045 221/265 |
| 4,947,579 A * | 8/1990 | Harrison | A01G 9/086 47/1.01 R |
| 5,048,434 A * | 9/1991 | Forster | A01C 11/025 111/104 |

(Continued)

FOREIGN PATENT DOCUMENTS

| | | | |
|---|---|---|---|
| CN | 107820797 A | * | 3/2018 |
| CN | 109220105 A | * | 1/2019 |

(Continued)

OTHER PUBLICATIONS

German Search Report issued in counterpart application No. 102020207300.7 dated May 6, 2021 (08 pages).

*Primary Examiner* — Jamie L McGowan

(57) ABSTRACT

A system for a high-efficiency planting operation for a work machine for planting saplings. The system comprises a conveying unit to store at least one tray of saplings and to transport the tray of saplings towards a gripping unit. The gripping unit retrieves at least one sapling from the tray and to release at least one sapling towards an indexing unit. The indexing unit is coupled to the gripping unit and individually releases a sapling for planting. A planting unit receives the sapling from the indexing unit and delivers the sapling into a ground. A sensing module is coupled to a plurality of sensors to detect a set of parameters and generates data input signals based on the parameters. A controller receives the data input signals and provides feedback to the conveying unit, the indexing unit or the planting unit to adjust actuators in response to the data input signals.

20 Claims, 22 Drawing Sheets

(56) References Cited

U.S. PATENT DOCUMENTS

| | | | |
|---|---|---|---|
| 5,209,170 A | 5/1993 | Kobayashi | |
| 5,247,761 A * | 9/1993 | Miles | A01G 9/086 |
| | | | 111/104 |
| 5,353,723 A * | 10/1994 | Tesch, Jr. | A01C 11/025 |
| | | | 111/919 |
| 5,445,089 A * | 8/1995 | Houng | A01C 11/025 |
| | | | 47/1.01 R |
| 5,564,352 A * | 10/1996 | Kondo | A01C 11/02 |
| | | | 111/104 |
| 5,622,122 A * | 4/1997 | Adair | A01C 11/006 |
| | | | 47/1.01 R |
| 5,842,306 A * | 12/1998 | Onosaka | A01C 11/025 |
| | | | 47/1.01 R |
| 7,051,475 B1 * | 5/2006 | Sena | A01C 11/025 |
| | | | 111/105 |
| 9,609,801 B2 * | 4/2017 | Kim | A01B 1/20 |
| 2002/0043195 A1 * | 4/2002 | Williames | A01C 11/025 |
| | | | 111/105 |
| 2019/0271356 A1 * | 9/2019 | Schaffert | A01C 7/06 |
| 2021/0329830 A1 * | 10/2021 | Hu | A01C 11/025 |

FOREIGN PATENT DOCUMENTS

| | | | | |
|---|---|---|---|---|
| CN | 209473218 U | 10/2019 | | |
| EP | 2265106 B1 * | 3/2013 | | A01C 11/006 |
| EP | 3011817 A1 | 4/2016 | | |
| JP | 2007006715 A * | 1/2007 | | |
| WO | 2018098576 A1 | 6/2018 | | |

* cited by examiner

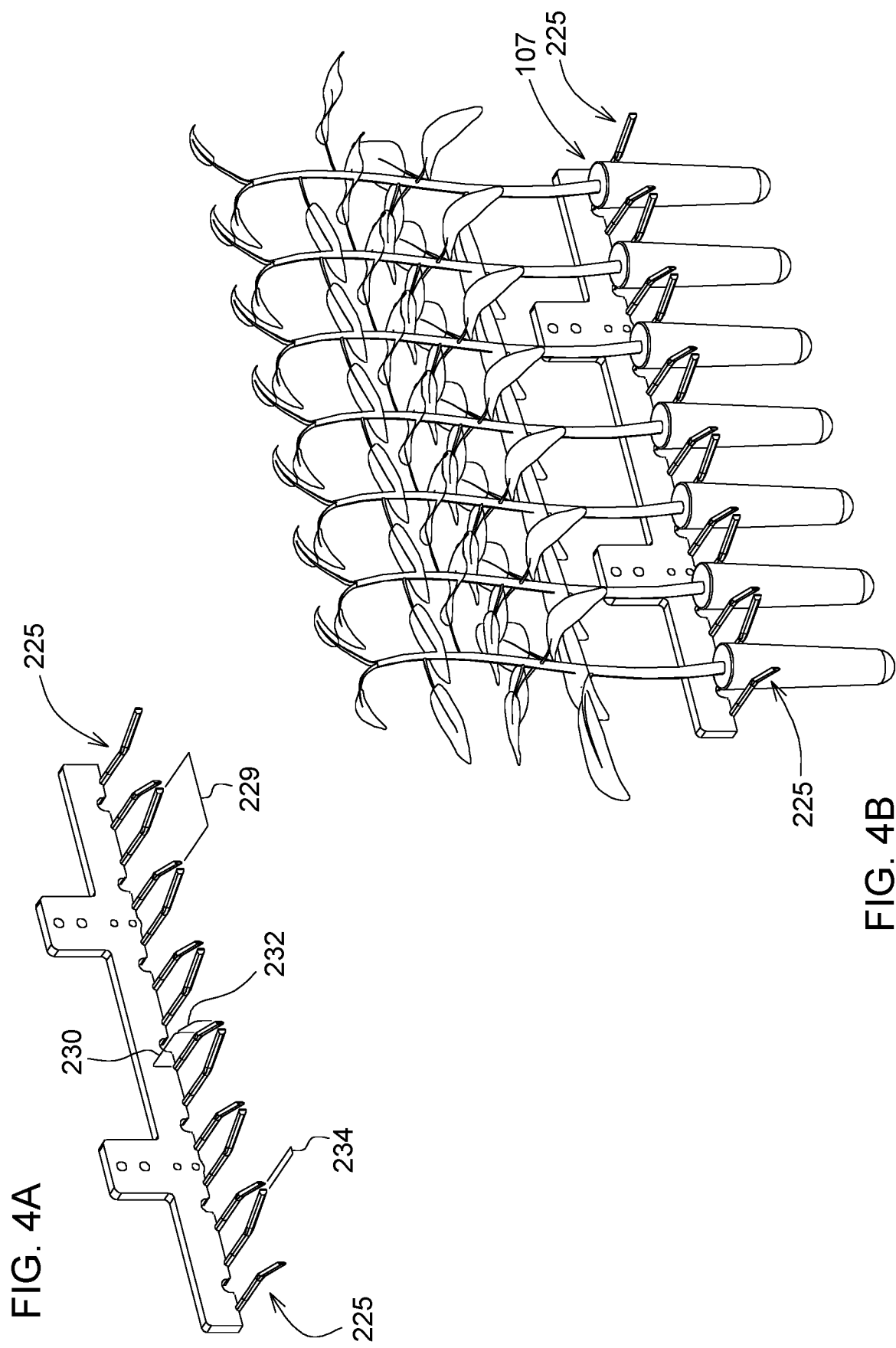

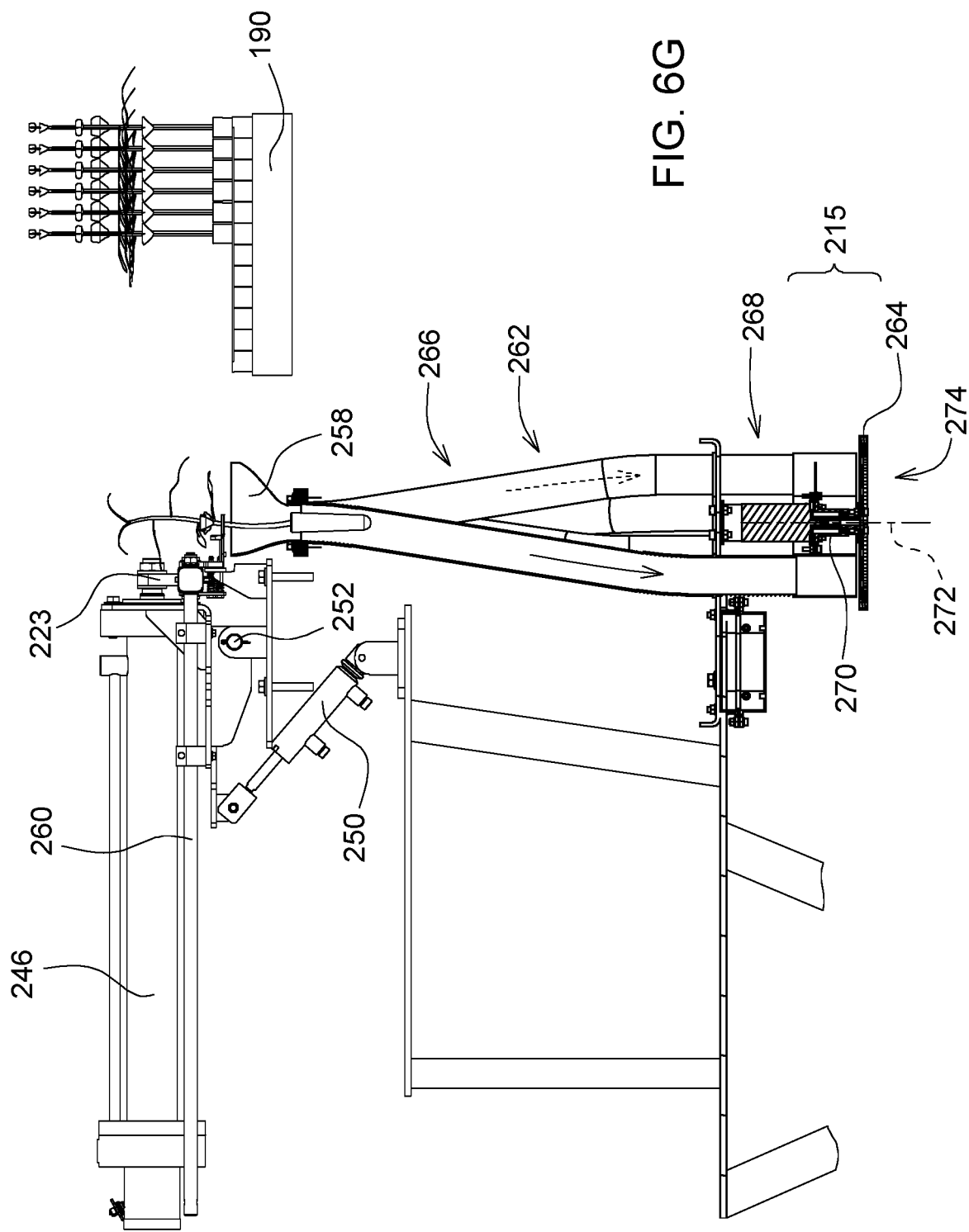

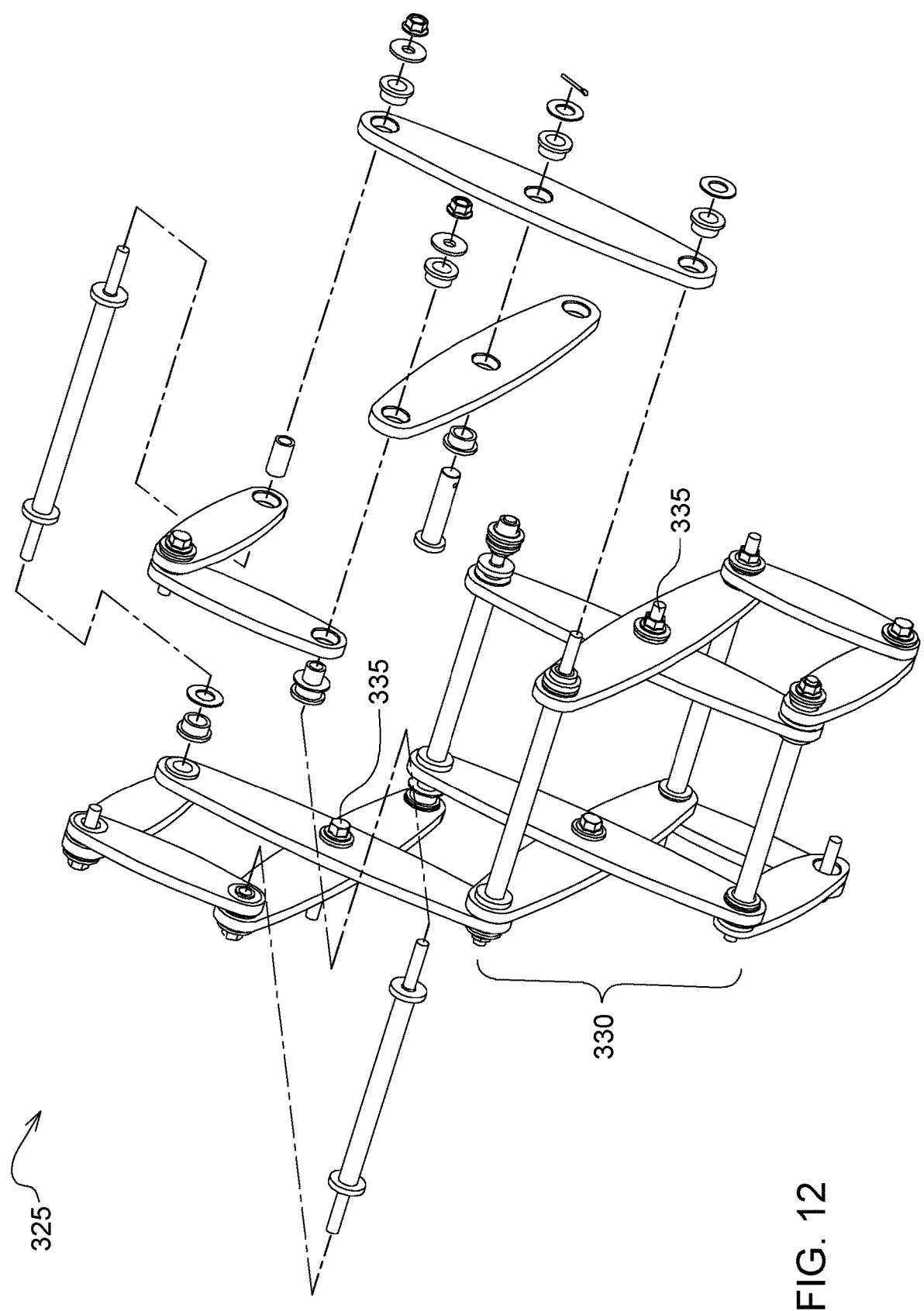

SAPLING PLANTING APPARATUS

CROSS-REFERENCE TO RELATED APPLICATIONS

N/A

FIELD OF THE DISCLOSURE

The present disclosure relates to a control system for a sapling planting apparatus for planting saplings into the ground through an automated process, or semi-automated process of a work machine. Various subsystems supporting the sapling planting apparatus, system, and method will also be discussed.

BACKGROUND

The silviculture process can be slow, cumbersome, and may require careful handling because the process involves planting fragile saplings into the ground. Furthermore, precision in planting depth, subsequent watering, fertilization, water retention around the sapling, and adequate spacing between saplings are some of many variables adding to the complexity to optimize the survival rates and growth of saplings once planted. Saplings can generally be sensitive to the environmental conditions, handling, and conditions of planting. Generally done by hand, therein lies a need for an automated or semi-automated process to efficiently and carefully plant a multitude of saplings into the ground to support reforestation efforts.

SUMMARY

A system for an apparatus and work machine for retrieving a sapling as part of a sapling planting apparatus when planting saplings in a field. A system for a high-efficiency planting operation for a work machine. The work machine includes a chassis including ground-engaging supports to facilitate propelling the chassis. The system comprises a conveying unit, a gripping unit, an indexing unit, a planting unit, a sensing module, and a controller. The conveying unit is coupled to the chassis to store at least one tray of saplings and configured to transport the at least one tray of saplings towards a gripping unit. The gripping unit is configured to retrieve at least one sapling from a tray and release the sapling towards the indexing unit. The indexing unit is coupled to the gripping unit, the indexing unit individually releasing a sapling for planting as the chassis is propelled. The planting unit is configured to receive the sapling from the indexing unit and deliver the sapling into a ground. A sensing module is coupled to a plurality of sensors. The sensing module is configured to detect a set of parameters defining delivery of the sapling into the ground and generate data input signals based on the parameters. The controller is coupled to the chassis and configured to receive the data input signals from the sensing module. The controller is programmed to provide feedback to at least one of the conveying unit, the indexing unit, and the planting unit to adjust one or more actuators in response to the data input signals.

The system may further comprise a location module coupled to a wireless location identification device and be configured to generate a sapling location signal.

The controller may further be configured to receive the sapling location signal from the location module. The controller may be programmed to save the sapling location signal in an asset location database such that the asset location database displays known locations of one or more saplings. The asset location database may further save at least one of a planting depth, a local time, a date, a sapling type, and a nursery source stamp correlating to the sapling location signal.

The system may further comprise a hydrating module coupled to the planting unit. The hydrating module is configured to generate a hydrate input signal to control the release valve to provide either water, hydrogel, or fertilizer to the sapling.

The system of claim 1 may further comprise a monitoring module coupled to at least one of the conveying unit, the indexing unit, and the planting unit. The monitoring module includes at least one camera and is configured to generate a visual display of one or more of the conveying unit, the indexing unit, and the planting unit on a user input interface.

The system may further comprise a navigation module coupled to the location module. The navigation module coordinating propulsion and steering of the chassis to a pre-planned navigable path. The pre-planned navigable path receives input from either a visual line path sensed by a visual device, a pre-programmed path comprising a series of sapling location points, or a path defined another work machine during a field preparation operation.

The plurality of sensors comprises a work machine speed sensor generating a work machine speed input signal. The delivery of the sapling into the ground comprises a displacement of the sapling in a horizontal direction opposite the direction of movement of the work machine. The displacement of the sapling in the horizontal direction equals a calculated displacement of the work machine based on the work machine input speed signal.

The plurality of sensors may further comprise a vertical displacement sensor configured to generate a vertical displacement input signal, wherein the delivery of the sapling into the ground comprises a dynamically variable displacement of the sapling in a vertical direction based on the vertical displacement input signal a pre-defined planting depth.

The plurality of sensors may further comprise an obstruction sensor configured to generate an obstruction input signal upon sensing an obstruction. The controller may abort planting of the sapling during an operation cycle based on the obstruction input signal.

The planting unit delivers sapling into the ground based on a cycle time or a planting distance.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 4A is a detailed perspective view of a portion of the gripping unit of the sapling retrieval apparatus;

FIG. 4B is a detailed perspective view of a portion of the gripping unit of the sapling retrieval apparatus with a row of saplings;

FIG. 6G is a schematic side view of a portion of the sapling retrieval apparatus in a sixth step, according to one embodiment;

FIG. 12 is an exploded view of a portion of the sapling apparatus;

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

As used herein, the term "controller" is a computing device including a processor and a memory. The "controller" may be a single device or alternatively multiple devices.

As used herein, the term "module" refers to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Figure 1:
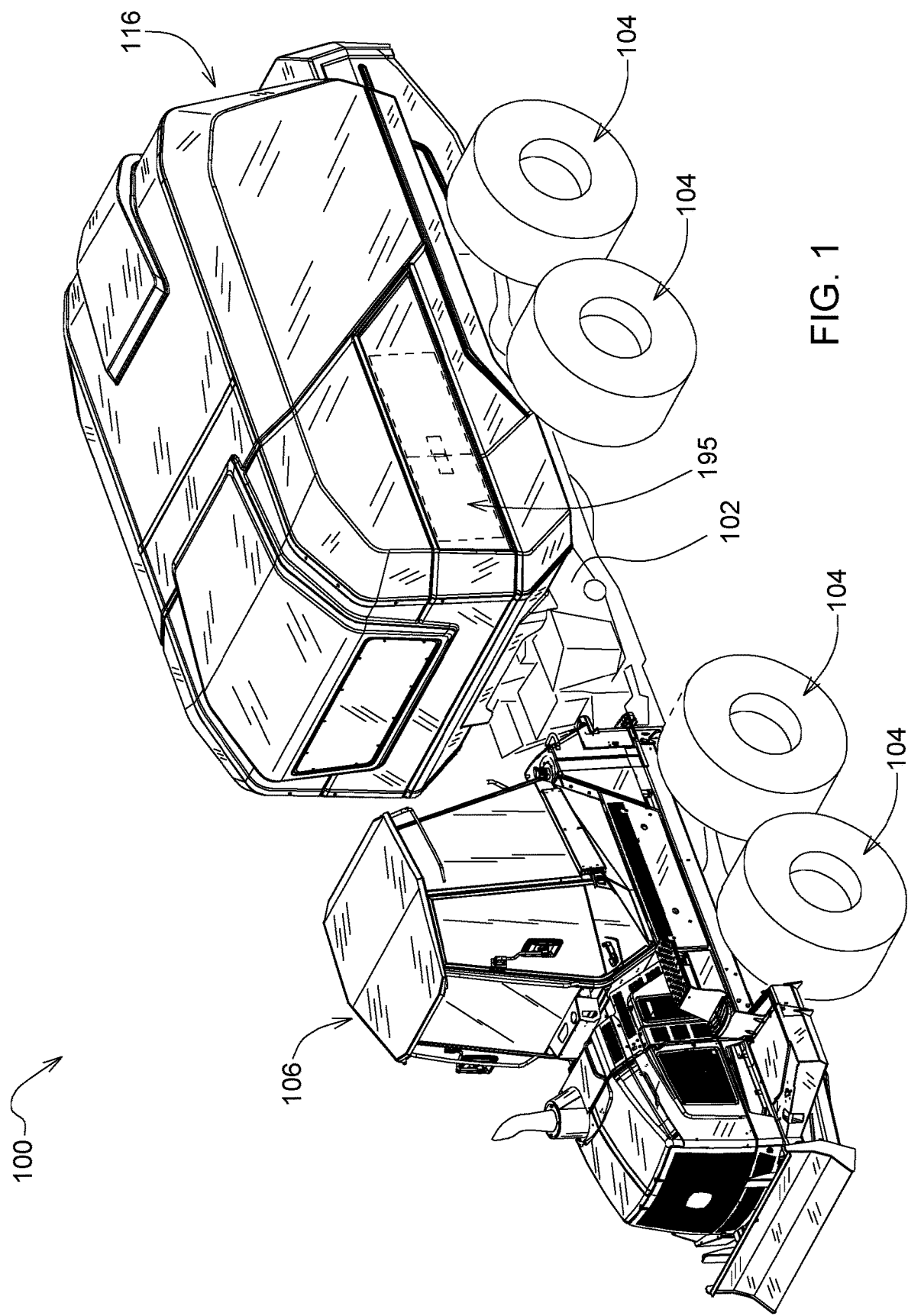
FIG. 1 is a perspective view of a work machine comprising a sapling planting apparatus within a housing.

FIG. 1 illustrates a perspective view of a work machine 100 comprising a sapling planting apparatus 300 (shown in FIGS. 2 and 3), according to one embodiment. It is intended that the sapling planting apparatus 300 provides for continuous sapling planting wherein the work machine 100 continues to advance as the apparatus plants the sapling into the ground, thereby advantageously reducing fuel consumption and increasing efficiency by minimizing a stop/start of the work machine when planting. Although planting of saplings can be done through a momentary pause as the roots of sapling are embedded into the ground, in the detailed embodiment shown, the work machine may advance continuously as the planting occurs, without pause. FIG. 1 discloses a work machine 100 inclusive of a sapling planting apparatus 300. An alternative embodiment may comprise a sapling planting apparatus 300 coupled to a work machine, such as a tractor, rather than a singular piece of equipment. Therein, the term work machine may include a sapling planting apparatus 300 on a work machine 100, or a work machine 100 towing a sapling planting apparatus 300. Note the sapling planting apparatus 300 is one of several subcomponents found within the planter vehicle. Furthermore, the terms "work machine" and "planter vehicle" may be used interchangeably throughout this disclosure.

The planter vehicle 100 may comprise of one or more subcomponents and/or subsystems described herein to automate or semi-automate the sapling planting process. The present disclosure includes a planting vehicle with multiple subsystems. However, used holistically or in part, these subsystems provide an improved process for planting multiple saplings through the automated or a semi-automated process. The work machine 100 may include a chassis 102, ground-engaging supports 104, such as wheels, and a propulsion system (not shown). The propulsion system, such as a diesel engine or motor, or an electric engine provides for motive power driving the wheel and for operating the other components associated with the planter vehicle 100 such as actuators. The operator cab 106, or alternatively a remote operating station (not shown) where an operator sits when operating the work machine 100, includes a user input interface with a plurality of controls (e.g. switches, joysticks, pedals, buttons, levers, display screens, etc.) for controlling the planter vehicle 100 during operation thereof.

Figure 2:
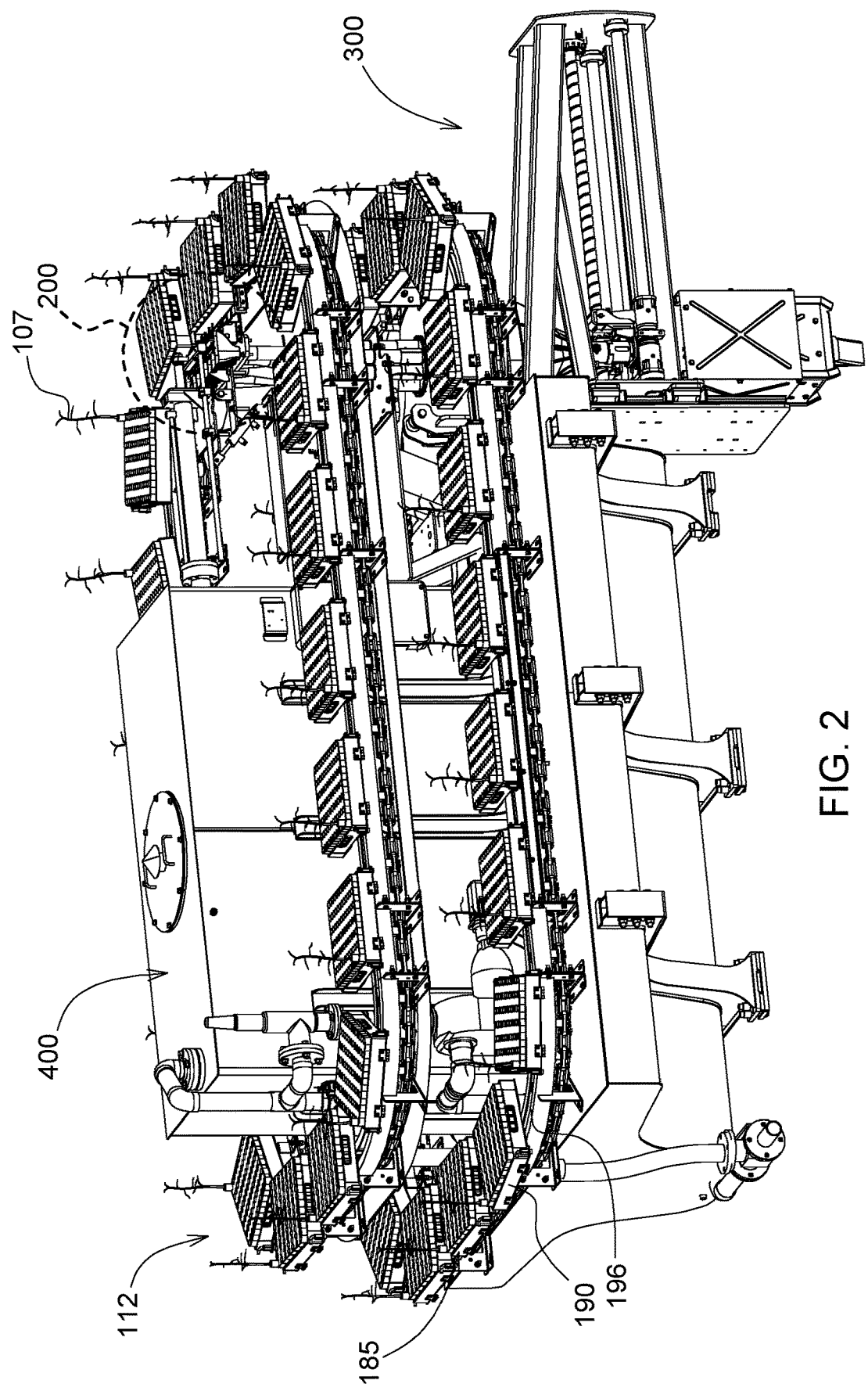
FIG. 2 is an angled side view of a portion of the embodiment contained in housing, shown in FIG. 1.
Figure 3A:
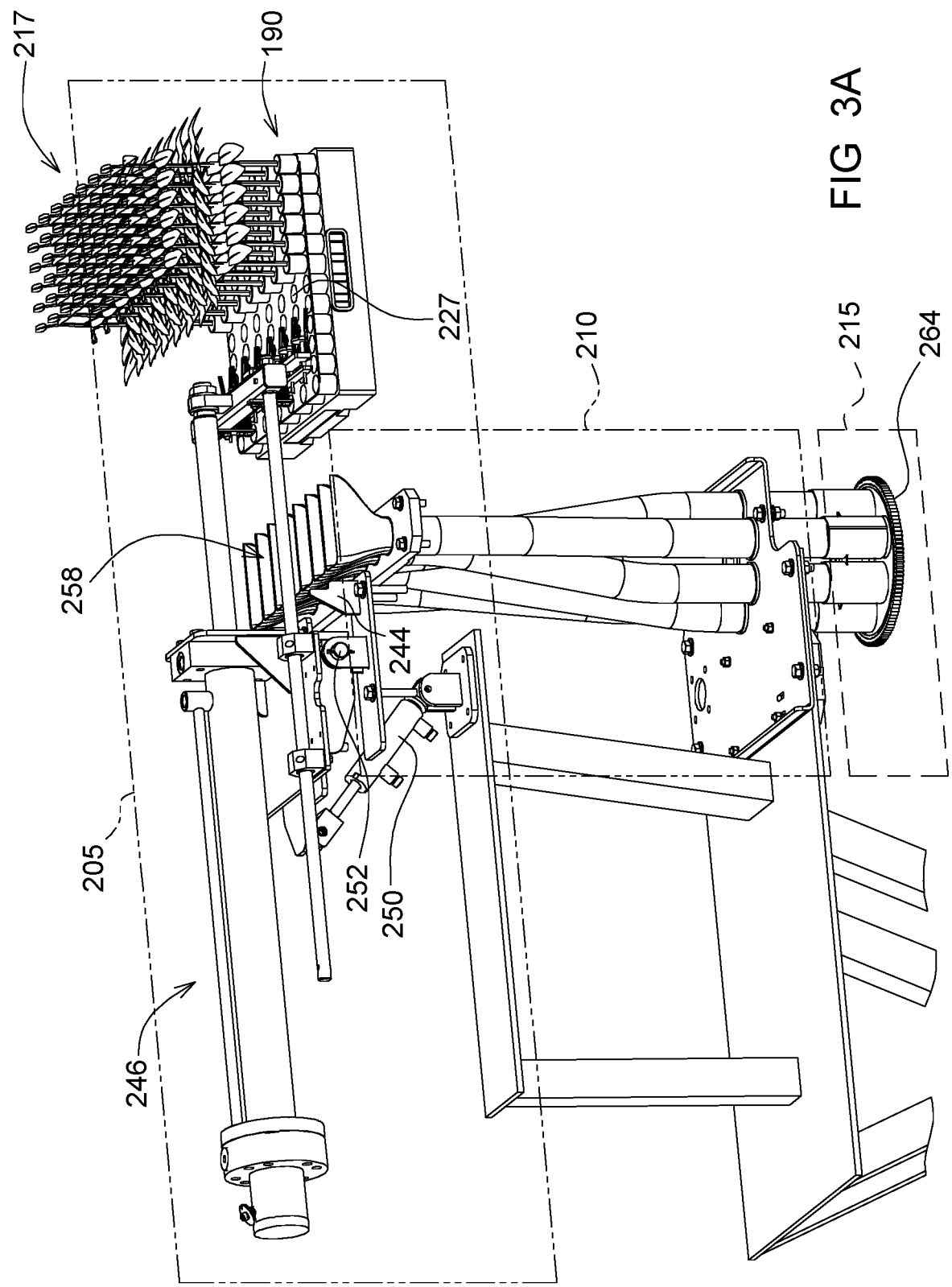
FIG. 3A is a first perspective view of the sapling retrieval apparatus.

As depicted in FIGS. 1 and 2, the forward portion or direction of the planter vehicle 100 is generally to the left and the rearward portion or direction of the planter vehicle 100 is generally to the right. The planter vehicle 100 may include a sapling retrieval apparatus 200 (as shown in the dotted area in FIG. 2) which retrieves saplings from a conveying unit 112 and feeds saplings into the sapling planting unit 300. The planter vehicle 100 may further include an external housing 116, which generally shields various subcomponents of the planter vehicle from dust, debris, winds, rain, and other harsh environmental conditions. The primary subcomponents and subsystems may include the conveying unit 112, the sapling retrieval apparatus 200, the sapling planting unit 300, and the sapling hydrating module 400 (which includes the water tank), a sensing module 305 (schematically depicted in FIG. 17) and a controller 180 (schematically depicted in FIG. 17).

The controller 180 may have one or more microprocessor-based electronic control units or controllers which perform calculations and comparisons and execute instructions. The controller 180 may also include a processor, a core, volatile and non-volatile memory, digital and analog inputs, and digital and analog outputs. The controller 180 may connect to and communicate with various input and output devices including, but not limited to, switches, relays, solenoids, actuators, light emitting diodes (LED's), liquid crystal displays (LCD's) and other types of displays, radio frequency devices (RFD's), sensors, and other controllers. The controller 180 may receive communication or signals, via electrically or any suitable electromagnetic communication, from one or more devices, determine an appropriate response or action, and send communication or signals to one or more devices. The controller 180 can be a programmable logic controller, also known as a PLC or programmable controller. The controller 180 may couple to a separate work machine electronic control system through a data bus, such as a CAN bus, or the controller 180 can be a part of the work machine electronic control system.

Figure 17:
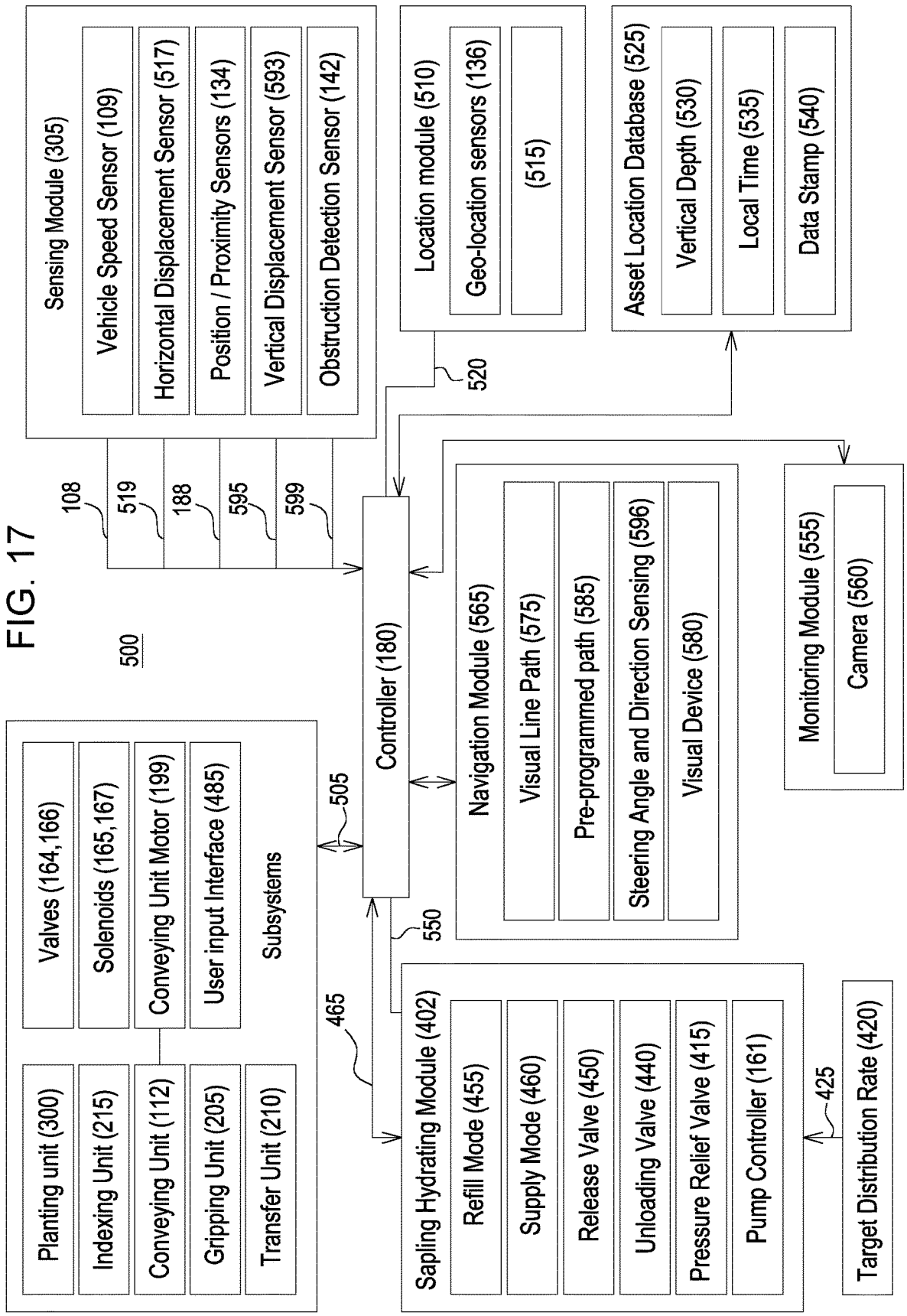
FIG. 17 is a schematic of the system of the high efficiency planting operation.

Now with continued reference to FIGS. 1 and 2, and shown in FIG. 17, the controller 180 may be in communication with one or more devices including, but not limited to, a vehicle speed sensor 109 to receive information about the vehicle speed; position/proximity sensors 134 to receive various positional inputs about the sapling stock as it moves through the planter vehicle 100; geo-location sensors 136 to receive information about the planter vehicle's location 520; obstruction detector sensors 544; the pump 430 and/or pump controller 161 to provide commands or instructions and/or receive information about direction and flow of hydrating fluid to and from the hydrating fluid storage tank 405; valves 164, 166 and/or solenoids 165, 167 to provide commands or instructions and/or receive information about position and actuation; visual inputs from cameras 560; and the user input interface 485 to receive commands or instructions and provide feedback. The controller 180 may receive communication from and provide communications, controls, or instructions to any of these devices and any of the subcomponents. This list is not all-inclusive and is detailed further below.

The planting vehicle 100 may move across a field and retrieve one or more saplings 107 (e.g. a eucalyptus tree) from its conveying unit 112. The planting vehicle 100 may then plant a sapling 107 into the ground, while watering and or fertilizing the sapling 107. Note that the while the present embodiment demonstrates planting of a single sapling at any given moment, the mechanism can be configured to two or more saplings at any given moment. The conveying unit 112 comprises a single loop conveyer 185 to support a multitude of trays 190, the trays 190 collectively have the capacity to hold thousands of saplings 107. The single loop conveyer 185 comprises an upper and lower level thereby minimizing the footprint traversing the ground, while maximizing storage capacity of the conveying unit 112 by infinitely looping and overlapping the upper loop and lower loop in the vertical direction. A sapling hydrating module 400 is found intertwine with the single loop conveyer 185 to optimize usage of space. Furthermore, the smaller footprint allows for ease of transportation along industry standard roadways when transporting the planter vehicle 100 from a first location to a second location.

The saplings are grouped in trays 190. The conveying unit 112 is configured to convey the trays 190 holding rows of saplings 217 towards the sapling retrieval apparatus 200 (shown in FIG. 3A) and indexes to a next tray 190 as each tray is emptied by the sapling retrieval apparatus 200. Trays 190 are replaced by an operator in an access area 195, wherein the operator may reload the conveying unit 112 with a new set of trays 190. The trays 190 are detachably coupled for sliding engagement on guide rails 196 in the conveying unit 112. In one exemplary embodiment, the trays 190 (only one of many identified in FIG. 2) are supported by wheeled trolleys engaged by the guide rails 196, a C-channel track. The loop moves the wheeled trolleys through a connected chain driven by a conveying unit motor 199. One or more position/proximity sensors 134 assist in positioning a tray 190 where the sapling retrieval apparatus 200 may access the saplings 107 (only one of many identified in FIG. 2). The controller 180 is programmed to control operation of the conveying unit 112, wherein the controller 180 actuates the conveying unit motor 199 upon receipt of proximity sensor input signals 188. A plurality of tags including information distinguishing each individual sapling (e.g. an identification code), row of saplings, or tray of saplings from others may be attached to trays, wherein the controller 180 is programmed to record information from a tag reader and process the information as the sapling is planted, thereby correlating the identification code with a geolocation of the sapling 107. This information may be aggregated in memory, thereby mapping productivity as it occurs. In one embodiment, the information can be visually displayed on a user input interface 485 as the planter vehicle progresses, or after completion of a sapling lot.

Now turning to the sapling retrieval apparatus 200 shown in FIGS. 1-2, 3-5, and 6A-6F, a subsystem of the planter vehicle 100 includes the sapling retrieval apparatus 200 wherein the apparatus is coupled to a chassis 102. The chassis 102, extending in a fore-aft direction, includes ground-engaging supports 104 to facilitate propelling the chassis 102. The sapling retrieval apparatus 200 comprises a gripping unit 205, a transfer unit 210, and an indexing unit 215. The gripping unit 205 retrieves a linear row of saplings 217 from a tray 190 and releases the row of saplings for transfer. The transfer unit 210 moves the released linear row of saplings 217 to the indexing unit 215 for individual delivery of each sapling 107 for planting as the chassis 102 is propelled.

The gripping unit 205 will generally retrieve the row of saplings 217 from the tray 190 stationed at a loading position on the single loop conveyer 185 (i.e. in sufficient proximity to the sapling retrieval apparatus 200 to enable the sapling retrieval apparatus to engage with a sapling 107 or row of saplings 217). As previously describe, the single loop conveyer 185 comprises wheeled trolleys coupled to the guide rails 196 on the conveying unit 112. As the gripping unit 205 completes retrieval of the rows of saplings 217 from a tray 190, the conveying unit 112 advances forward placing another tray 190 at a loading position. The gripping unit 205 comprises a head 223, a row of flexible arms 225 coupled to the head 223 wherein the row of flexible arms 225, linearly arranged in a plane, is configured to engage the row of saplings 217 in the tray 190. In the detailed embodiment shown in FIG. 3A, it is intended that the sapling retrieval apparatus 200 be able to accommodate any saplings in a tray 190 without the need to manually separate individual saplings 107 from the trays. The tray 190 comprises one or more rows of sapling chambers 227 to hold a pre-defined number of saplings 107. The present embodiment identifies a cross-section of 7 chambers with each chamber carrying one sapling 107. However, in alternative embodiment this number may be more or less, and possibly just one. The row of flexible arms 225 may correspond to the row of sapling chambers 227 in the tray 190. However, it should be noted that other configurations of trays and flexible arms are possible and within the scope of the present disclosure. This can easily be reconfigured by modifying the head 223 with a different set of flexible arms to correspond with a different tray 190.

Figure 5:
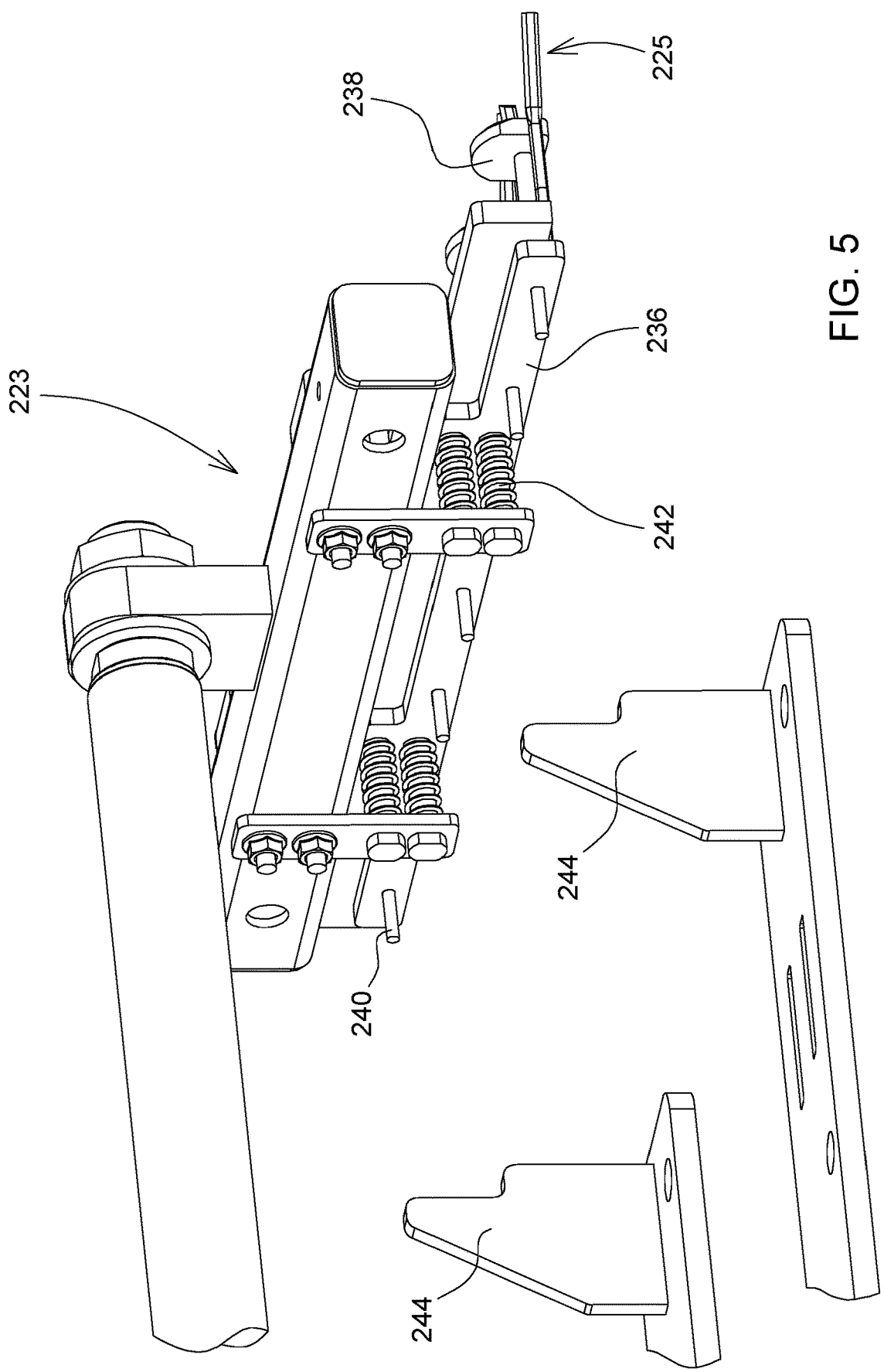
FIG. 5 is a perspective view of the gripping unit of the sapling retrieval apparatus with stopper.

Referring to FIGS. 4A and 4B, detailing a portion of head 223, a single pair of flexible arms 229 from the row of flexible arms 225 comprises of two oppositely oriented arms in a same plane. The two oppositely oriented arms comprise of a grip portion 230 (two parallel arm portions in the same plane) and a receiving portion 232 wherein the receiving portion 232 angles outwards with a larger cross-sectional gap than the grip portion 230 to funnel the sapling 107 into position within the grip portion 230. A predefined length of the grip portion 230 ensures only one sapling 107 is engaged with a single pair of flexible arms 229 at any one time. Gaps 234 exist between each pair of flexible arms 229 allowing room for them to flex as they engage the sapling 107. The flexible arms 229 may be made of a material with enough strength such as stainless steel, nitinol, or polycarbonate, for example. The material must be sufficiently flexible to engage the sapling 107, yet rigid enough to hold the sapling 107 firmly with minimal impact from vibrations when the planter vehicle 100 is running. The flexible arms 229 may also have a coating to ensure the flexible arms 229 sufficiently endure the repetitive wear motions from repeated engagement with the saplings. As seen in FIG. 5, the head 223 further comprises a push plate 236, a row of push rods 238 corresponding to the row of saplings 217, sliding rods 240, and pusher springs 242 wherein the push plate 236 engages with a stopper 244.

Figure 6A:
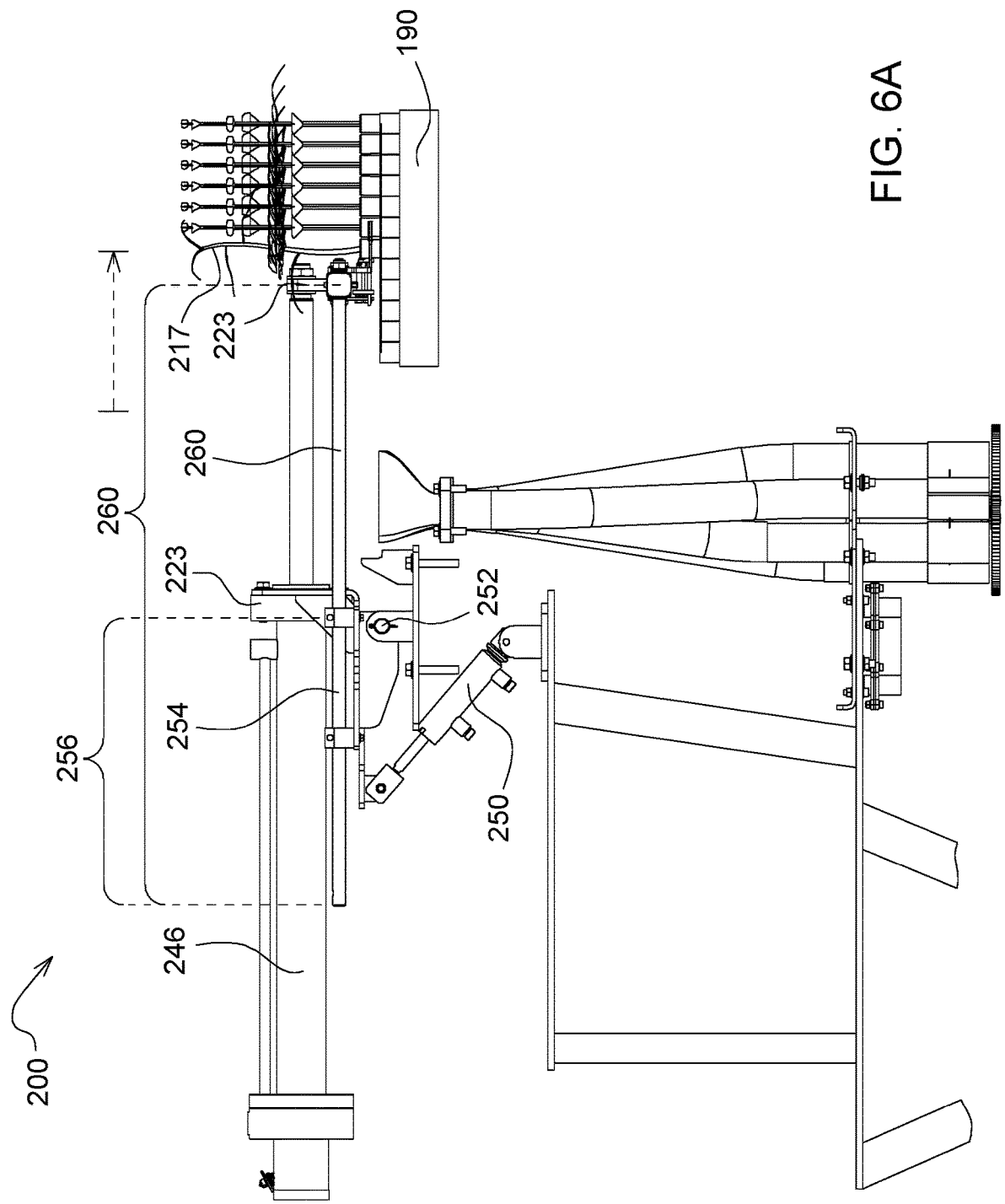
FIG. 6A is a schematic side view of a portion of the sapling retrieval apparatus in a first step, according to one embodiment.

FIGS. 6A-6G illustrates sequential movement of various subsystems of the sapling retrieval apparatus 200 and how the various components mentioned above work together. The gripping unit 205 further comprises a first actuator 246 operatively coupled to the head 223 to move the head horizontally in a fore-aft direction. A second actuator 250 is operatively coupled to the head 223 to rotate the head about a pivot point 252 coupled to a shaft 254. The shaft 254 has a first shaft section 256 and a second shaft section 260. The first shaft section 256 is coupled to the second actuator 250 and the second shaft section 260 is coupled to the head 223. FIG. 6A illustrates actuation of the first actuator 246 (through extension in this embodiment) in the direction indicated by the dotted arrow such that the row of flexible arms 225 engage the linear row of saplings 217 located in tray 190 to a predefined distance as communicated by the controller 180. Note that although the first actuator 246 extends head 223 in the aft direction, the first actuator 246 may extend the head 223 in any direction and the direction of extension depends on the relative placement of head 223 with respect to the tray 190 of saplings 107 on the conveying unit 112. A position/proximity sensor 134 coupled to the first actuator 246 determines when the head 223 has reached the predefined distance to engage the designated row of saplings 217. Note the predefined distance may also be determined by a pressure feedback loop wherein a sensor may generate a signal when the head reaches a minimum pressure threshold as the gripper arms engage the saplings. Alternatively, the predefined distance may be based on known distances of spacing between sapling chambers 227.

Figure 6B:
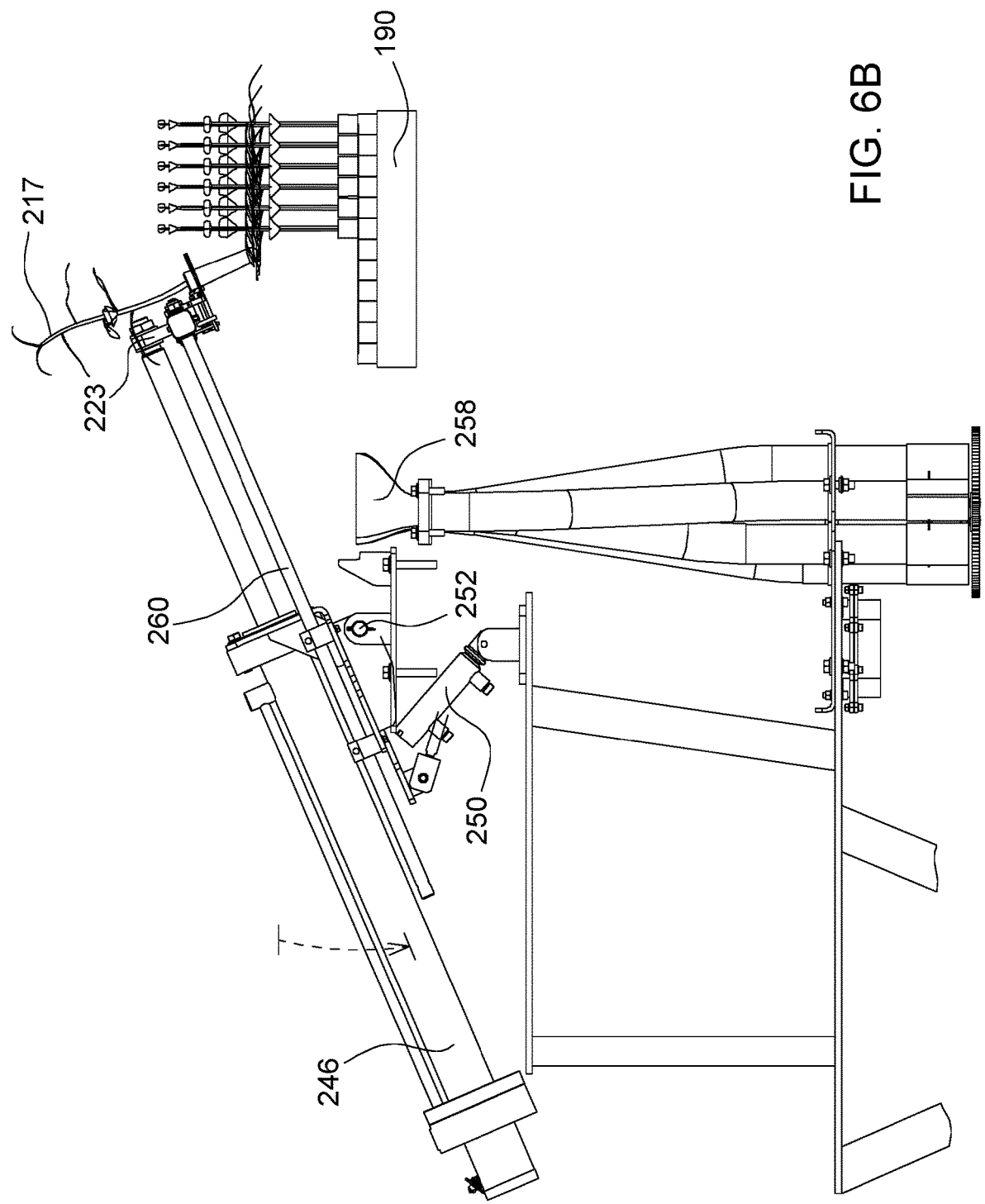
FIG. 6B is a schematic side view of a portion of the sapling retrieval apparatus in a second step, according to one embodiment.
Figure 6C:
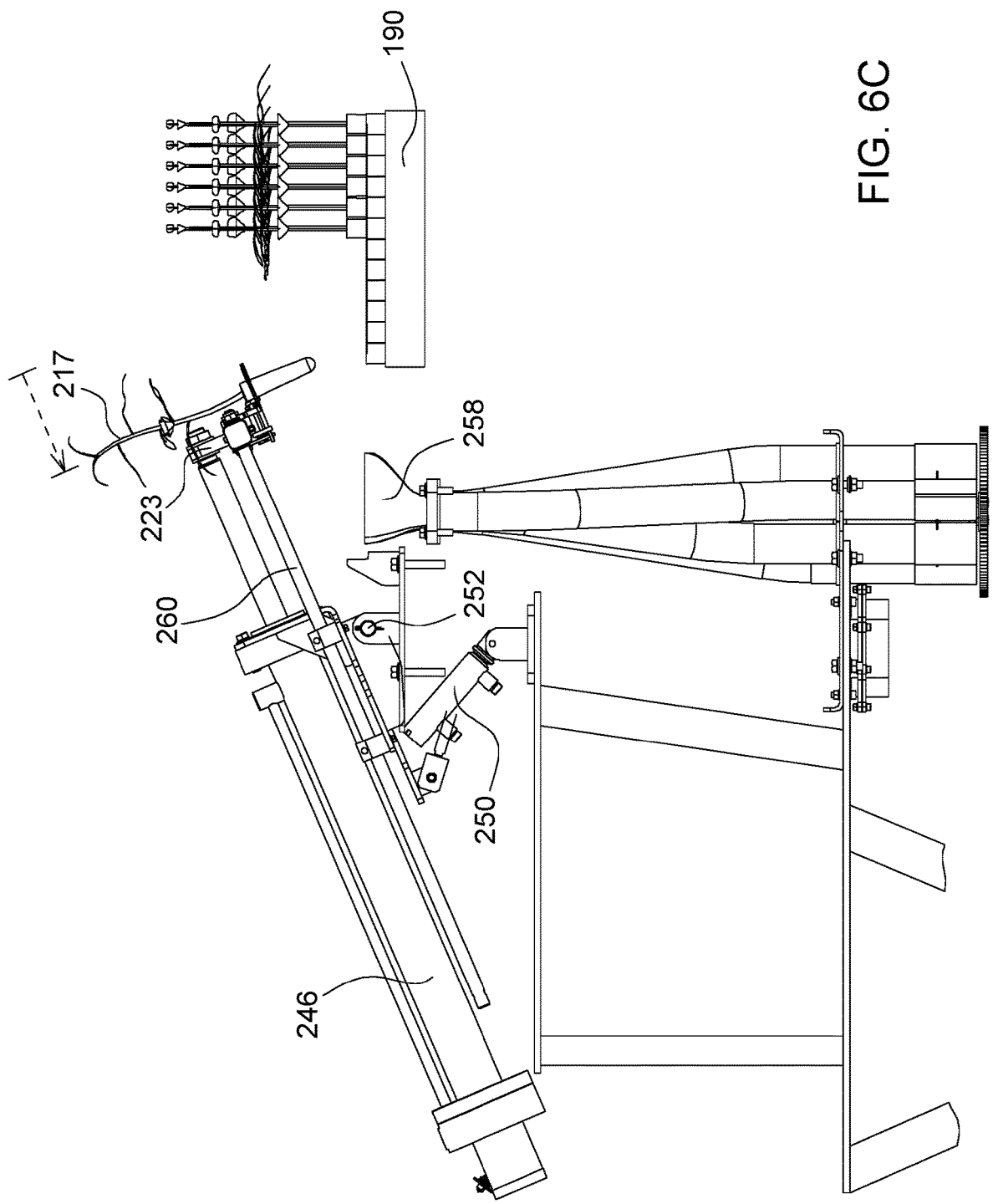
FIG. 6C is a schematic side view of a portion of the sapling retrieval apparatus in a third step, according to one embodiment.
Figure 6D:
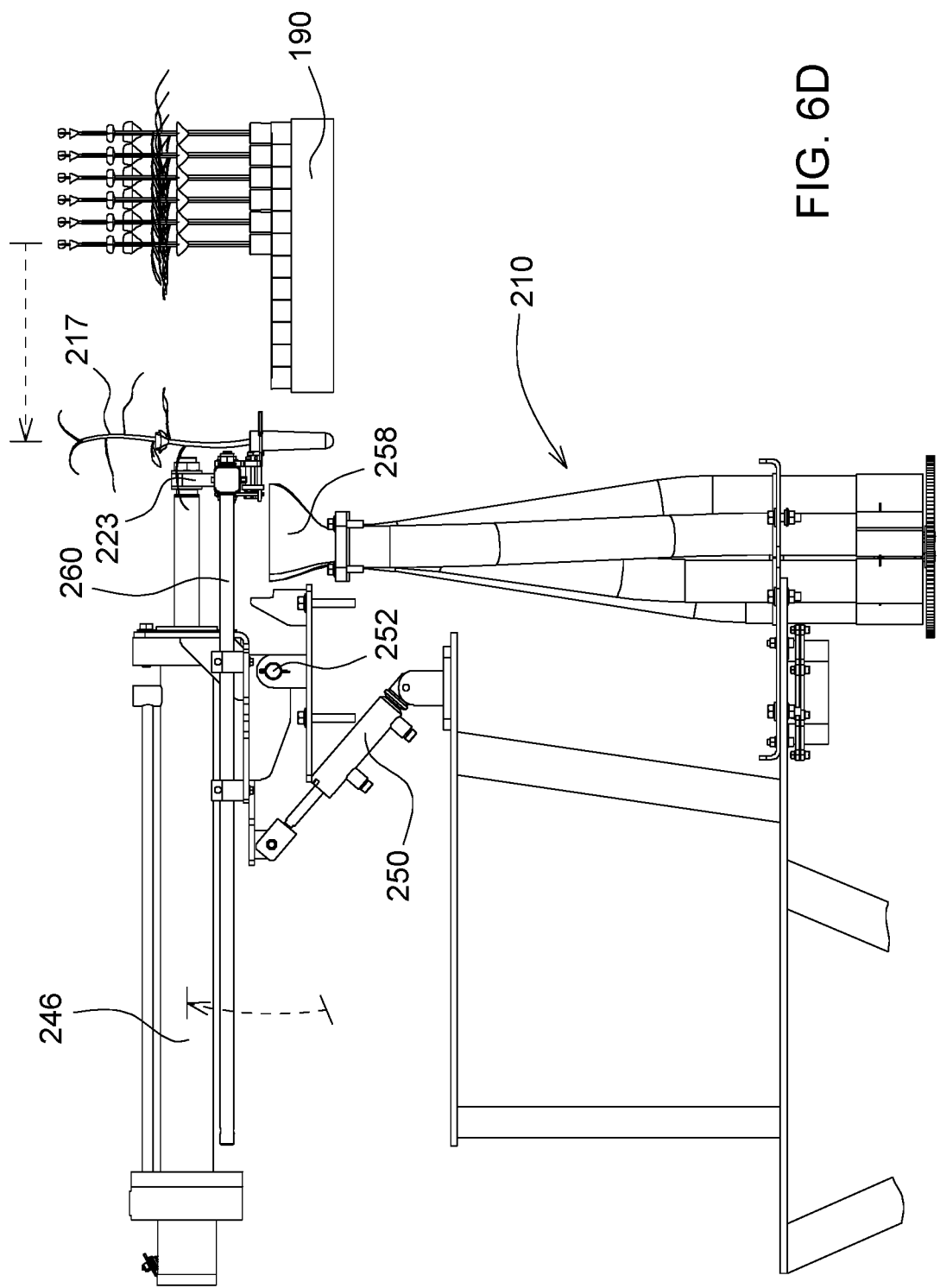
FIG. 6D is a schematic side view of a portion of the sapling retrieval apparatus in a fourth step, according to one embodiment.
Figure 6F:
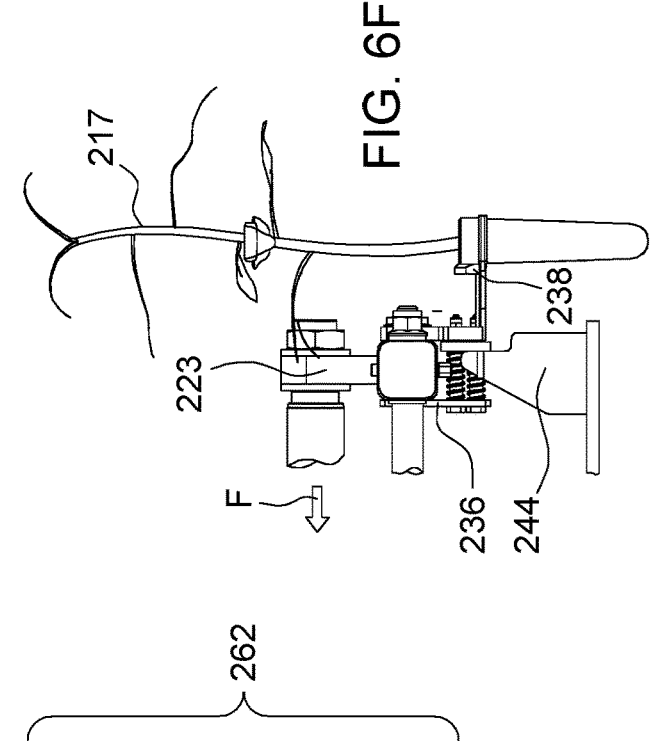
FIG. 6F is detailed side view of a portion of the sapling retrieval apparatus outlined in the dotted area shown in FIG. 6E.
Figure 6E:
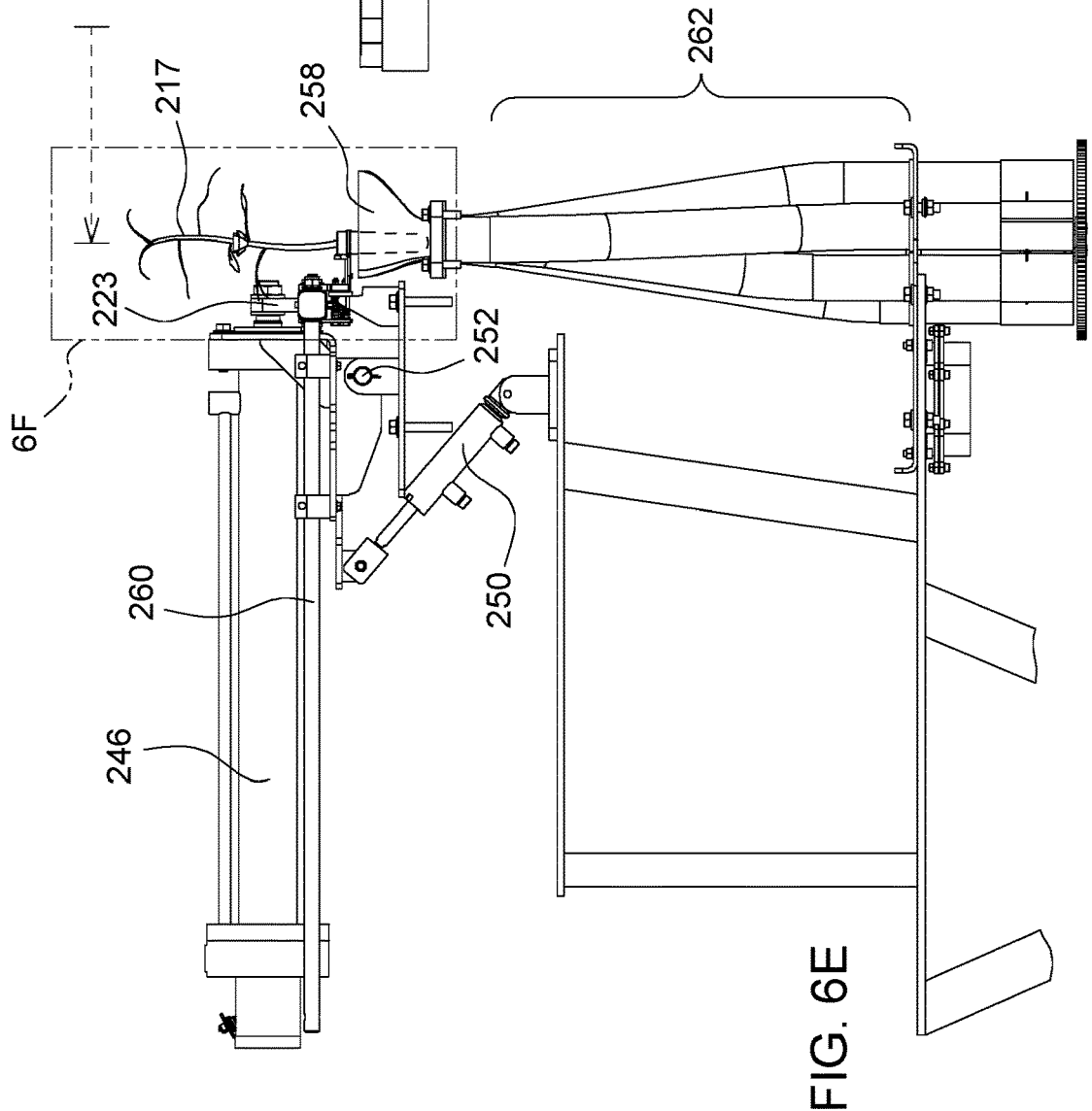
FIG. 6E is a schematic side view of a portion of the sapling retrieval apparatus in a fifth step, according to one embodiment.

Now turning to FIG. 6B, actuating the second actuator 250 (through retraction) rotates the head 223 upwards about the pivot point 252 (indicated by the dotted arrow) lifting the row of saplings 217 from the tray 190. Rotating head upwards while the linear row of saplings 217 remain engaged with the row of flexible arms 225 and the first actuator 246 remains extended, ensures the roots of saplings disengage from tray 190 with minimal disturbance. FIG. 6C, illustrates the subsequent step wherein the first actuator 246 begins to retract. As this occurs, the second actuator 250 begins to extend thereby rotating the head 223 downwards by levering the second shaft section 260 about the pivot point 252. Note, the occurrence of the step shown in FIG. 6B may or may not partially overlap with occurrence of the step shown in FIG. 6C. As shown in FIGS. 6D-6F, continuously moving the first actuator 246 in a fore direction positions the row of sapling above the transfer unit 210, or more specifically above or within the receiving funnels 258. FIG. 6E, and in particular, detailed view in FIG. 6F, illustrates the continued retraction of the head 223 away from the tray 190. The gripping unit 205 further comprises a stopper 244, and a push plate 236 coupled with a row of push rods 238, wherein the row of push rods may correspond to the row of saplings 217. The push plate 236 abuts the stopper 244 as the head 223, comprising the row of flexible arms 225 holding the row of saplings 217, continues to move away from tray 190. As the head 223 continues to move in the fore direction, the row of push rods 238 disengages the row of saplings 217 from the row of flexible arms 225 to the transfer unit 210. In this embodiment, the stopper remains stationary. In alternative embodiments, the stopper may move in the aft direction, that is opposite the direction of the head 223. As this occurs, further retraction of the head 223 in the fore direction moves the row of saplings 217 forward from a grip portion 230 of the row of flexible arms 225 to a receiving portion 232 of the row of flexible arms 225, thereby disengaging the saplings from the flexible arms, subsequently dropping saplings towards the transfer unit 210.

The transfer unit 210 comprises a row of receiving funnels 258 for receiving the row of saplings 217 upon disengagement from the row of flexible arms 225. The transfer unit 210 further comprises a row of guiding tubes 262 correspondingly coupled to the row of receiving funnels 258 for transfer of saplings 217 towards the indexing unit 215. In this particular embodiment, seven receiving funnels 258 individually receive the seven saplings from the row of saplings 217. The seven saplings then individually pass through seven guiding tubes 262 to rest on the indexing plate 264. The guiding tubes 262 are of a cross-sectional shape, dimension, and orientation configured to transfer saplings towards the indexing unit 215 with use of only gravitational force. In the present embodiment, the guiding tubes 262 are round or oval in cross-section although they could alternatively be of a different cross-sectional shape, and the guiding tubes 262 are larger in cross-section than the cross-section of a sapling. The guiding tubes 262 are configured wherein the first ends 266 of the guiding tubes 262 are aligned in a straight row coupled to the receiving funnels 258. The second end 268 of the guiding tubes 262 are equally spaced on a circular periphery to align with the indexing plate 264. Guiding tubes 262 are sequentially positioned from a linear row near receiving funnels 258 at the first end 266 to a circular form at second end 268.

The indexing unit 215 comprises an indexing plate 264 wherein the indexing plate is positioned below the guiding tubes 262. The indexing motor 270 may be operatively coupled to the indexing plate 264 for movement of the indexing plate. Note that FIG. 6G shows a cross-section of transfer unit 210 and indexing unit 215 to demonstrate one placement option of the indexing motor 270. The present embodiment rotates the indexing plate 264 about an axis 272 for individual release of a sapling 107. An individual sapling 107 is released through the single aperture 274 in indexing plate 264 sufficiently sized to pass only one sapling, (note remaining portions of indexing plate are closed) wherein the aperture 274 indexes from a first guiding tube to a second guiding tube for sequential release of a first sapling and a second sapling. The indexing plate 264 having the aperture 274 continues to index the aperture 274 sequentially aligning the aperture 274 with the third guiding tube holding the third sapling, the fourth guiding tube holding the fourth sapling, etc. until each sapling from the row of saplings 217 is released for planting towards the sapling planting unit 300.

Figure 3B:
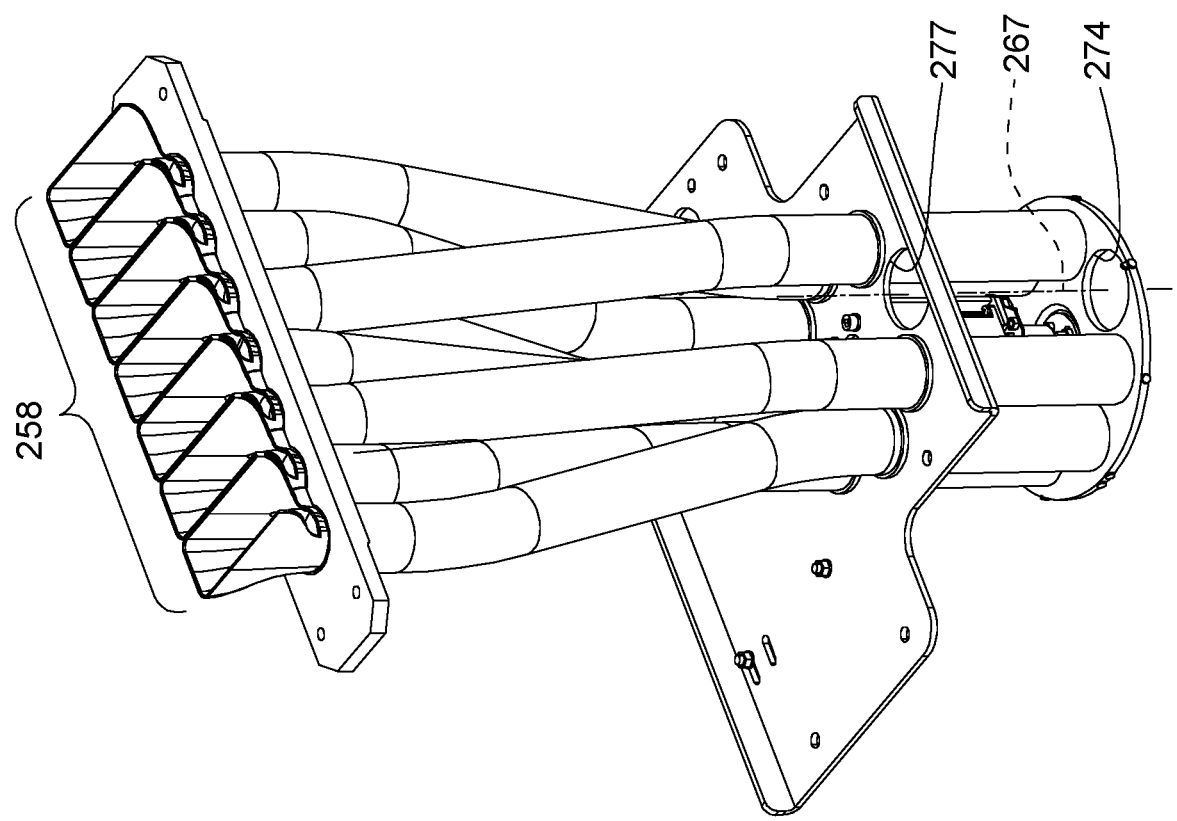
FIG. 3B is a second perspective view of a portion of the sapling retrieval apparatus.

The aperture 274 in indexing plate 264 may further align with a dummy tube position 267 (shown in FIG. 3B). The dummy tube position 267 is a position where the aperture 274 aligns with a marker 277 indicative of a rest position, or in this instance, a second aperture absent a guiding tube 262 for carrying a sapling. Alignment of the aperture 274 with the dummy tube position 267 may enable release of a row of saplings 217 by advantageously avoiding an unintended release of a sapling 107 for planting towards the sapling planting unit 300. A row of saplings 217 are simultaneously dropped in receiving funnels 258. Placement of the aperture 274 in the dummy tube position provides a momentary park position for each sapling 107 to drop into position for sequential release for planting. Furthermore, the dummy tube position resets alignment of the indexing plate for a planting cycle, to avoid any cumulative error in positioning. Sensors may be used to measure any misalignment. This measurement may be used as feedback to the controller 180 when indexing the indexing plate 264 at the next planting cycle.

The steps illustrated in FIGS. 6A through 6D continue to occur until every row of saplings 217 from tray 190 is delivered to the sapling planting unit 300 and planted. The conveying unit 112 indexes the next tray 190 into position for the sapling retrieval apparatus to repeat retrieval of the rows of saplings 217 and delivery to the sapling planting unit 300. Note that although the embodiment disclosed herein describes retrieval of a row of saplings 217, alternative embodiments may retrieve only one sapling 107 for planting by using a similar mechanism, or release more than one sapling for planting simultaneously.

FIGS. 7, 8A-8C, 9-12, and 13A-13E illustrates the next steps of planting a sapling. The sapling planting unit 300 comprises a tube 302 (shown in FIGS. 10, 11, and 13A-13E), housed within housing 340, and configured for delivering the saplings 107 towards the ground, wherein a spade 304 coupled to the tube is configured for penetrating the ground for planting the sapling 107. However, the sapling planting unit 300 of the present embodiment may enable movement that advantageously minimizes impacting the integrity of the sapling as the chassis 102 (shown in FIG. 1) continues to propel forward during planting, effectively transferring zero drag onto the sapling. The planting vehicle 100 advantageously achieves a stationary or nearly stationary planting condition wherein a portion of the sapling planting unit 300 moves an equal and opposite direction to the chassis 102 propel direction such that the tube 302 containing sapling 107 is stationary with respect to the ground when planting. As a first step, the sapling planting unit 300 receives an individual sapling 107 in the hopper 301 as saplings are released from the indexing unit 215 located in the sapling retrieval apparatus, or more particularly as indexing plate 264 positions to release an individual sapling 107.

Figure 7:
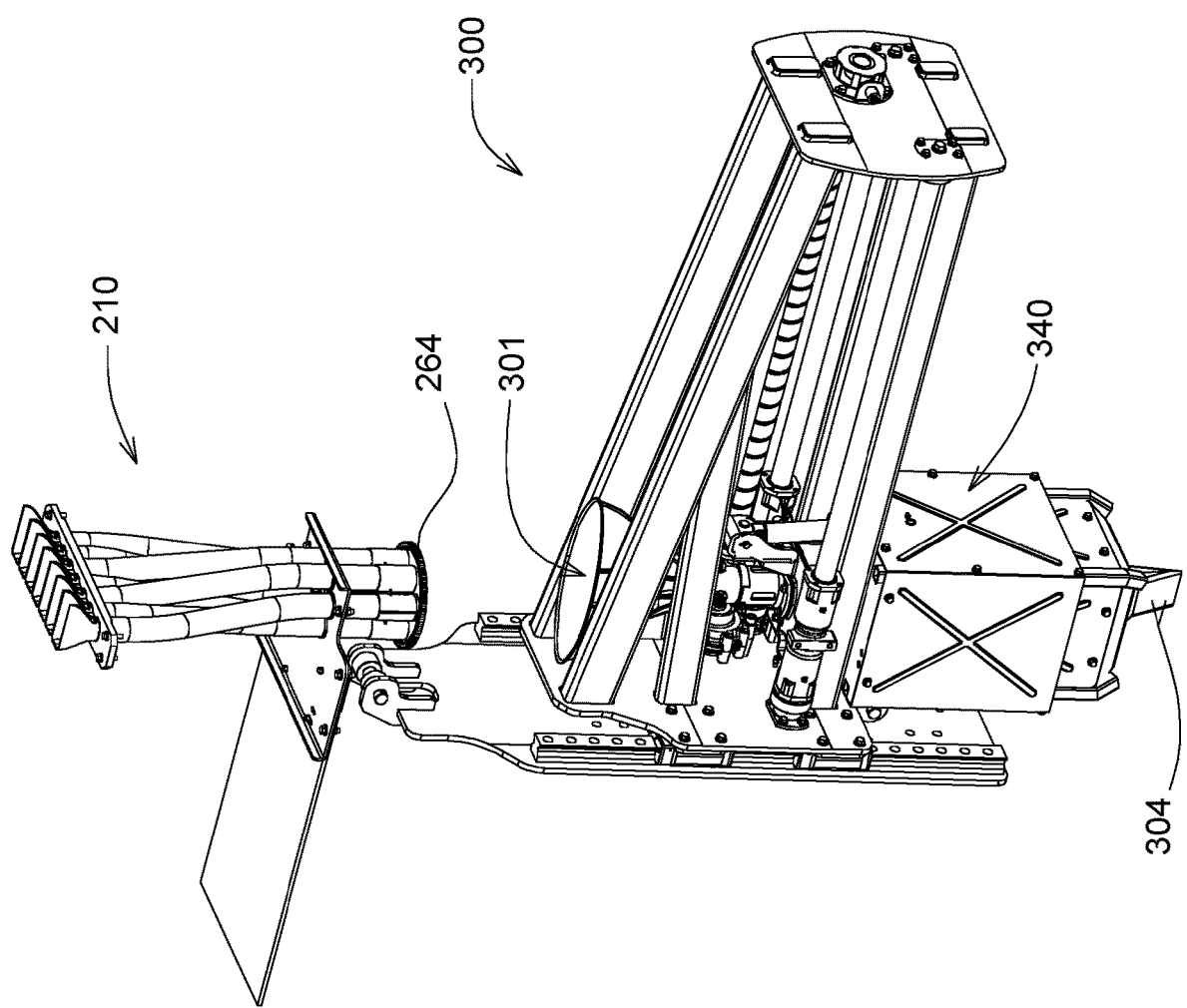
FIG. 7 is a perspective view of the sapling planting apparatus, according to one embodiment.
Figure 9:
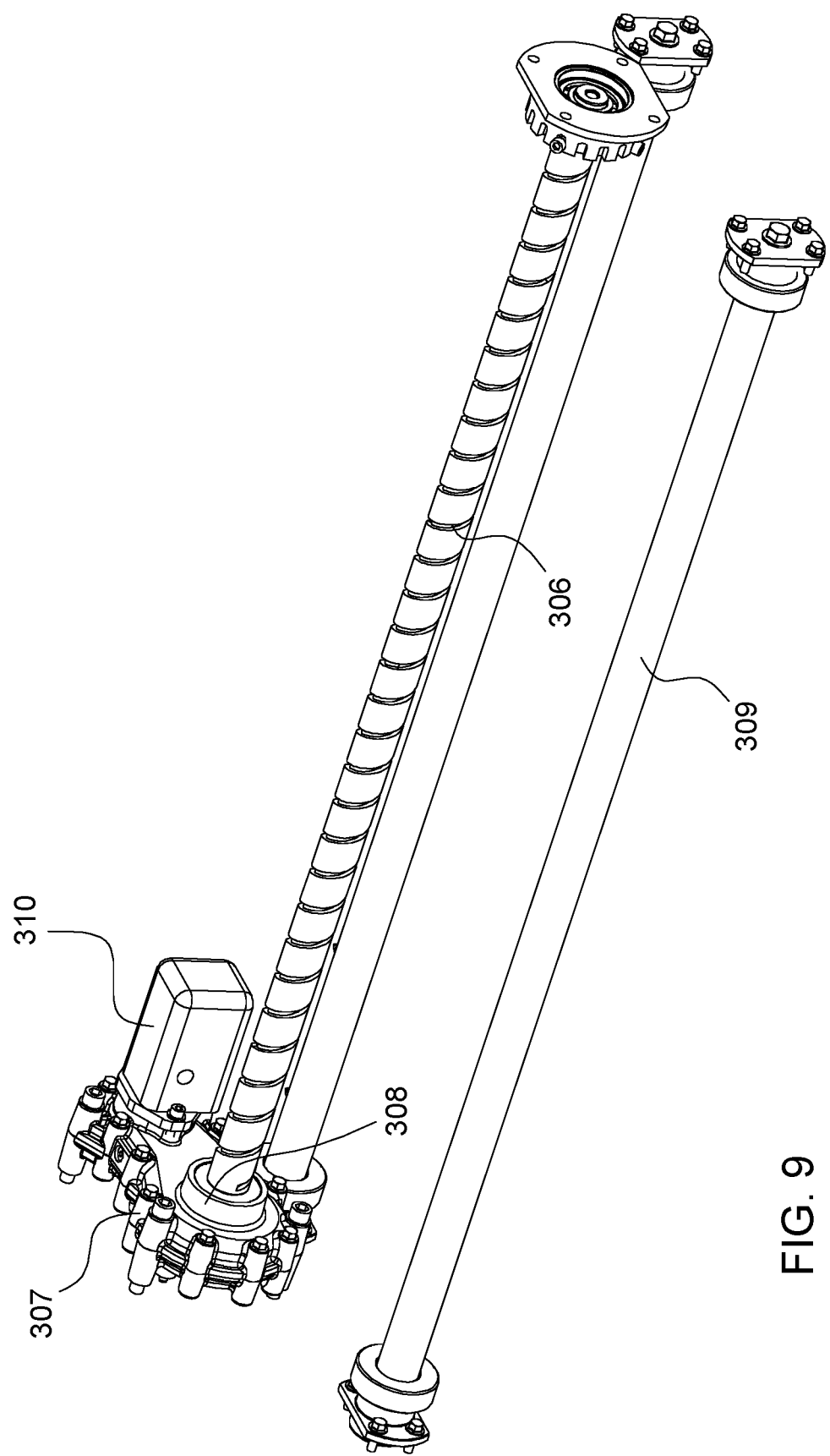
FIG. 9 is a perspective view of a portion of the sapling apparatus.
Figure 10:
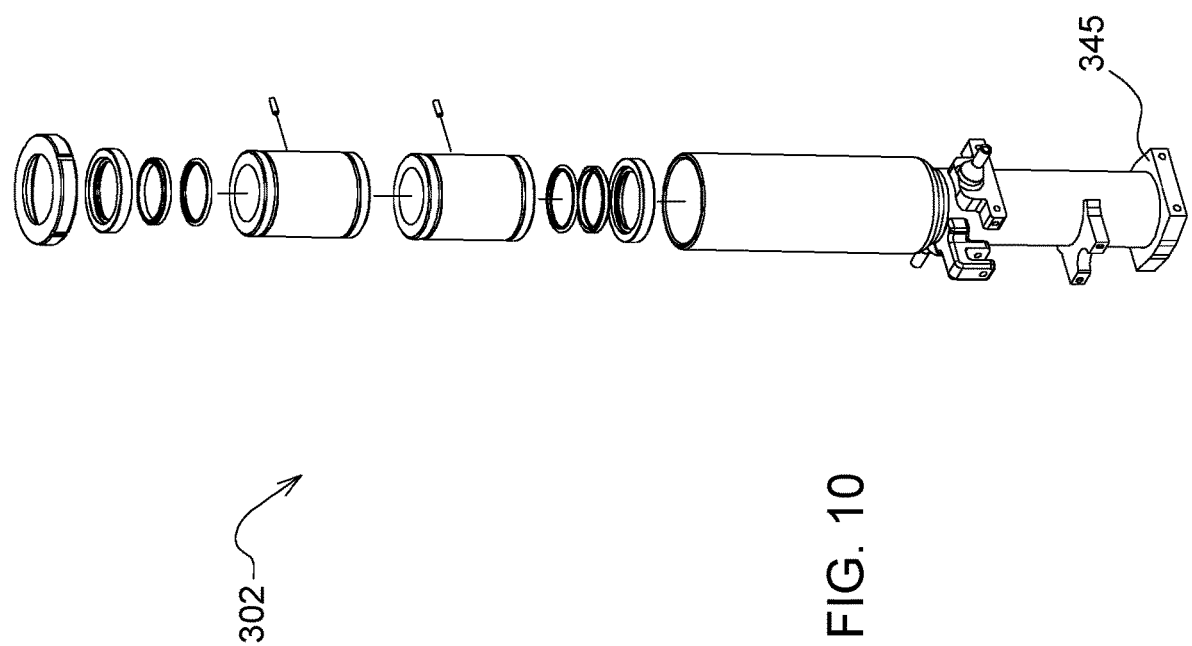
FIG. 10 is an exploded view of a portion of the sapling apparatus.

A detailed portion of the sapling planting unit 300 from FIG. 7 is shown in FIG. 9. This detailed portion, enables the tube 302 to move with zero drag as the planter vehicle 100 propels forward. This portion of the sapling planting unit comprises a screw 306; a nut 308 in threaded engagement with the outer surface of the screw 306; and a motor 310 operatively coupled to the screw 306 to rotatably drive the screw 306, wherein rotation of the screw translates the nut 308 in a first direction. This first direction may generally be opposite the direction of travel of the chassis. In varying embodiments, the motor 310 may be directly coupled to the screw 306 or alternatively through torque amplifier linkage (e.g. gear linkage 307 as shown in FIG. 9).

Figure 13E:
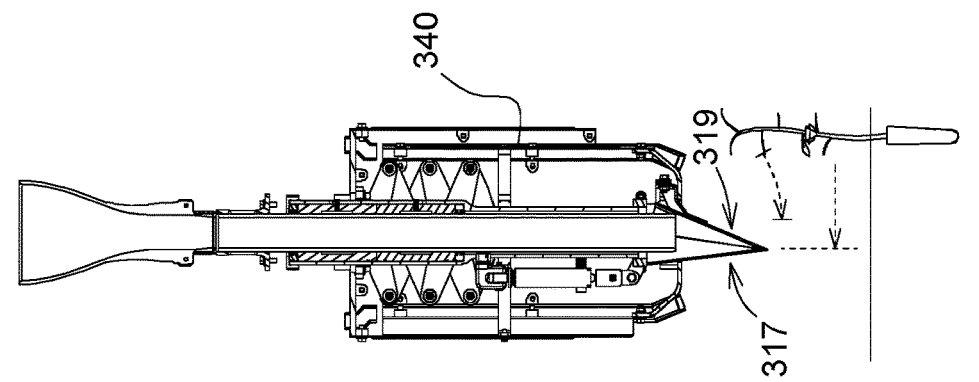
FIG. 13E is a cross-sectional view of the sapling planting apparatus in a fifth position, according to one embodiment.
Figure 13D:
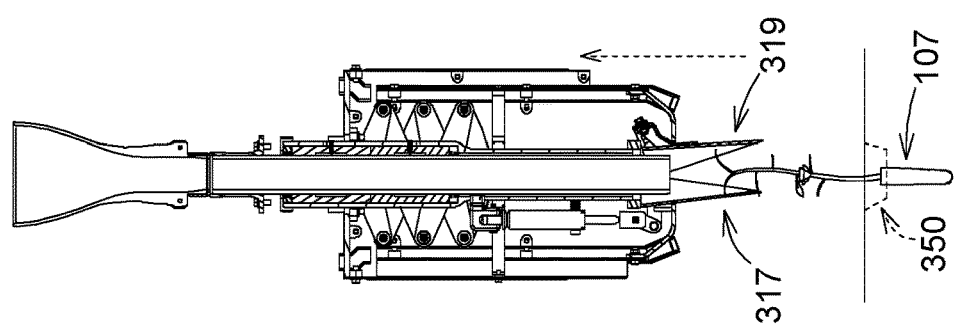
FIG. 13D is a cross-sectional view of the sapling planting apparatus in a fourth position, according to one embodiment.

The sapling planting unit 300 further comprises a tube 302 configured for delivering the sapling 107 towards the ground 312 wherein the tube 302 is coupled to the nut 308, and the tube 302 is telescopically extendable in a second direction from a rest position (shown in FIGS. 8A and 8C), and retractable towards the rest position (FIGS. 13D-E). The tube 302 may further be coupled to a support rod 309 as it traverses the length of the screw 306. The tube 302 may be one of several cross-sectional shapes (e.g. cylindrical, triangular, hexagonal) and is not limited to the embodiment shown. A dig actuator 315 may be operatively coupled to the tube 302 wherein the dig actuator 315 actuates the tube 302 from the rest position (shown in FIG. 8A) to the extended position (shown in FIG. 8B). A base cylinder (not shown) may further be operatively coupled to the sapling planting unit 300 to allow variable depth movement of the rest position in a vertical direction, relative to chassis 102. With the tube 302 being telescopically moveable, the sapling planting unit 300 advantageously maintains ground clearance when not planting, penetrates the soil with an impactful force with the momentum acquired from movement of the tube 302, and assists in compaction of the soil while providing a travel path for sapling without requiring any additional subcomponents or subsystems for execution. The telescopic feature of the tube further adds to the planting unit compactness, thereby minimizing space required in the planter vehicle 100. Impaction of the tube 302 with the soil further creates a well 350 surrounding the sapling 107 to prevent water from flowing away from planted sapling 107.

A spade 304 configured for penetrating the ground 312 for planting the sapling 107 is coupled to the tube 302. The speed of translating the nut 308 and the speed of travel of the chassis 102 may be the same while the spade 304 is in contact with the ground 312, at minimum. As shown in FIGS. 13A-E, the spade 304 comprises a fixedly attached spade portion 317 and a rotatably attached spade portion 319. A spade actuator 321, operatively coupled to the spade 304, moves the spade 304 from an open position to a closed position by rotating open the rotatably attached spade portion 319. Opening the spade 304 drops the sapling 107 into the ground 312 in addition to creating an aperture in ground for sapling placement. The spade actuator 321 may be coupled to spade 304 directly or through a scissor mechanism 330 to amplify the force of the spade actuator 321. Amplifying the force of the spade actuator 321 enables the spade 304 to penetrate the soil with greater force.

Figure 8C:
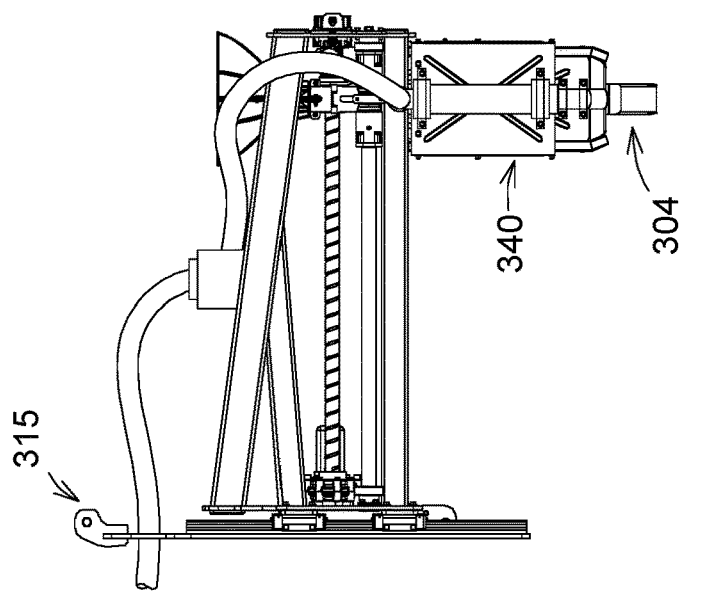
FIG. 8C is a side view of the sapling planting apparatus in a third position, according to one embodiment.
Figure 8B:
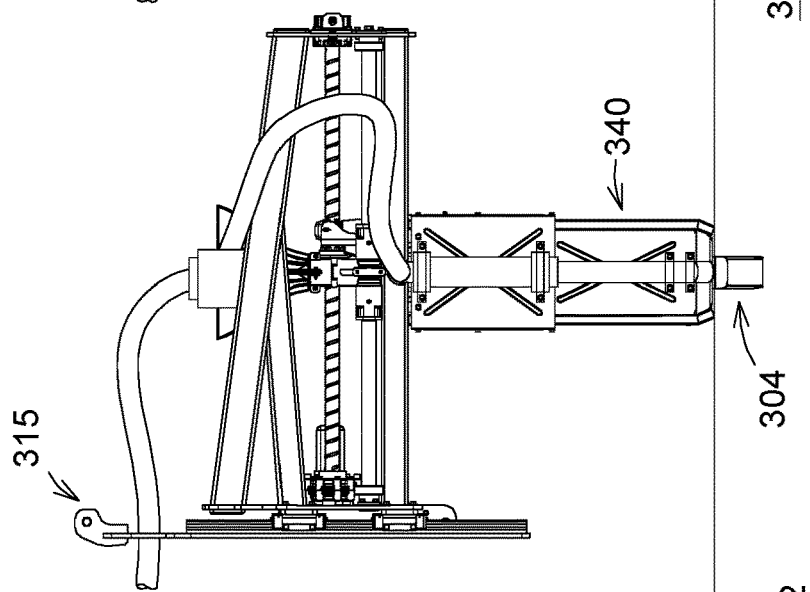
FIG. 8B is a side view of the sapling planting apparatus in a second position, according to one embodiment.
Figure 8A:
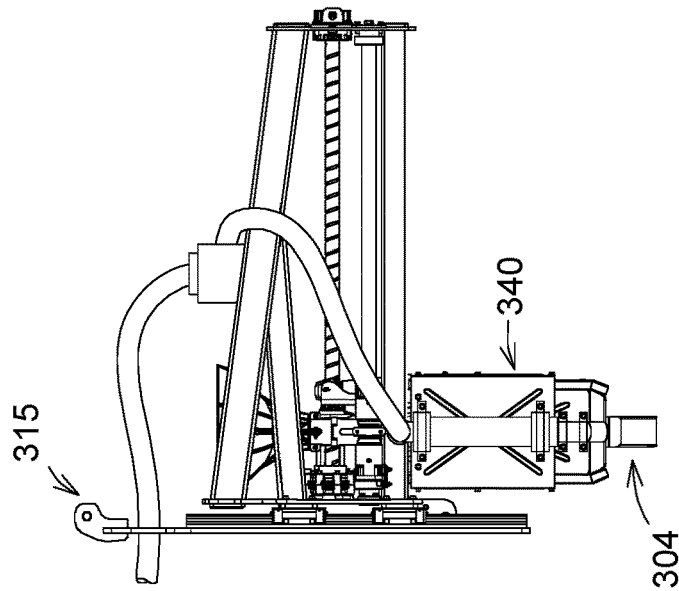
FIG. 8A is a side view of the sapling planting apparatus in a first position, according to one embodiment.

Upon planting the sapling 107 into the ground, the nut 308 translates in a reverse direction, the reverse direction being opposite the first direction, after the tube has begun to telescopically retract in an upward direction toward the rest position. Again, the tube retracts upwards towards the rest position using the dig actuator 315 (as shown in FIG. 8C). In one embodiment, the nut 308 may only translate in the reverse direction towards the home position (i.e. starting point from beginning of planting cycle) once a subsequent planting cycle has begun. In another embodiment, the nut 308 may translate in the reverse direction towards the home position as the latter part of the planting cycle. The tube 302 may or may not completely retract to the rest position as the sapling planting unit plants a first sapling, and subsequent saplings because the extent of retraction depends on cycle times of sapling planting, and/or speed of the planter vehicle 100. The spade 304, on the other hand, always closes at the end of a cycle ensuring a subsequent sapling is not dropped prior to the reaching the next planting location. Furthermore, the spade 304 only closes at the end of cycle, after the spade 304 has cleared sapling 107 planted in the ground by rotating close the rotatably attached spade portion 319.

The sapling planting unit 300 may further comprise a scissor mechanism 325 operatively interposed between the dig actuator 315 and the tube 302. As detailed in FIG. 12 (an exploded view) and shown in FIGS. 13A-13E, the scissor mechanism 325 may comprise one or more pairs of relatively moveable crossed scissor arms 330. Each pair of scissor arms 330 has a pivot means interconnecting the pair of scissor arms 330 for relative movement of the scissor arms about the pivot axis 335. Actuating the dig actuator 315 actuates the one or more pair of scissor arms 330 to extend towards the ground 312, wherein the pair of scissor arms 330 amplifies movement caused by the dig actuator 315. More specifically, the dig actuator 315 amplifies the stroke length and velocity movement of the tube 302. In one exemplary embodiment, for example, if the dig actuator 315 moves the spade 304 toward the ground X inches, the scissor arms amplifies this movement by moving spade 3X inches towards the ground 312. The scissor mechanism 325 is enclosed and environmentally shielded in a housing assembly as shown in FIGS. 7, 8A-8C, 11 and 13A-13E.

Figure 13C:
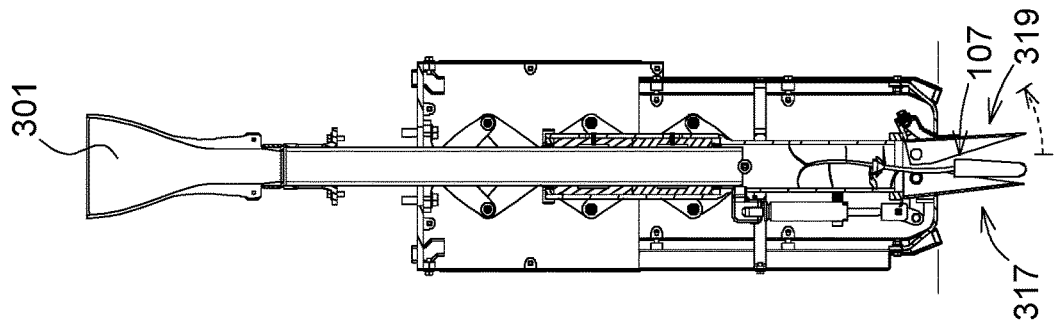
FIG. 13C is a cross-sectional view of the sapling planting apparatus in a third position, according to one embodiment.
Figure 13B:
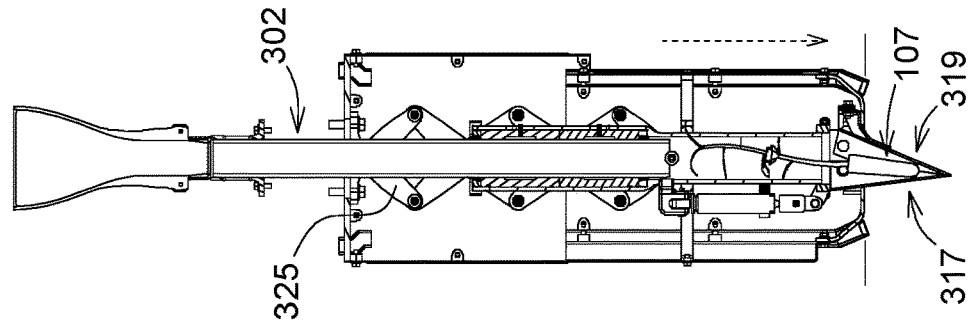
FIG. 13B is a cross-sectional view of the sapling planting apparatus in a second position, according to one embodiment.
Figure 13A:
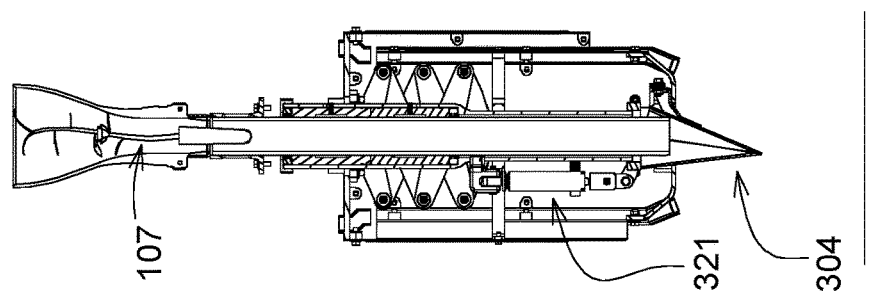
FIG. 13A is a cross-sectional view of the sapling planting apparatus in a first position, according to one embodiment.

FIGS. 13A-E illustrates cross-sectional views of the sapling planting apparatus 300 during various portions of the planting cycle. FIG. 13A illustrates a first part of the planting cycle wherein the tube 302 and scissor arms 330 are in a retracted position at rest position with the intended direction of movement being towards the ground 312. Sapling 107 is received in the hopper 301 from the indexing unit 215. The spade 304 is in the closed position where the rotatably attached spade portion 319 is held closed by the spade actuator 321. The housing assembly 340 environmentally shields the tube 302 and scissor mechanism 325. Similar to the tube 302, the housing assembly 340 also telescopically extends and retracts. FIG. 13B illustrates an intermediate part of the planting cycle wherein the tube 302 impacts the ground 312 as the scissor mechanism 325 amplifies the length, impact, and force of extension of the tube 302 to engage the ground 312. Although the scissor mechanism 325 is used to magnify extension and force, the scissor mechanism 325 may use other alternative methods as well (e.g. spring-extensions, belt system, etc.). At this point, the sapling 107 has dropped with gravitational force, to be released by the spade 304. FIG. 13C illustrates opening of spade 304 where the rotatably attached spade portion 319 rotates to open aperture made by spade 304 in the ground 312 and release sapling 107 into the aperture. FIG. 13D illustrates retraction of the tube 302 towards the rest position. A well 350 (demonstrated by the dotted line) has been created by the footprint of the end of tube 345, and spade 304. The rotatably attached spade portion 319 remains open during retraction to ensure the spade 304 clears the sapling prior to closing, thereby avoiding interference with the sapling 107. FIG. 13E illustrates the full retraction of the tube 302 to the rest position and closing of the spade 304, while the nut 308 returns to the home position in preparation for planting the next sapling 107.

Figure 11:
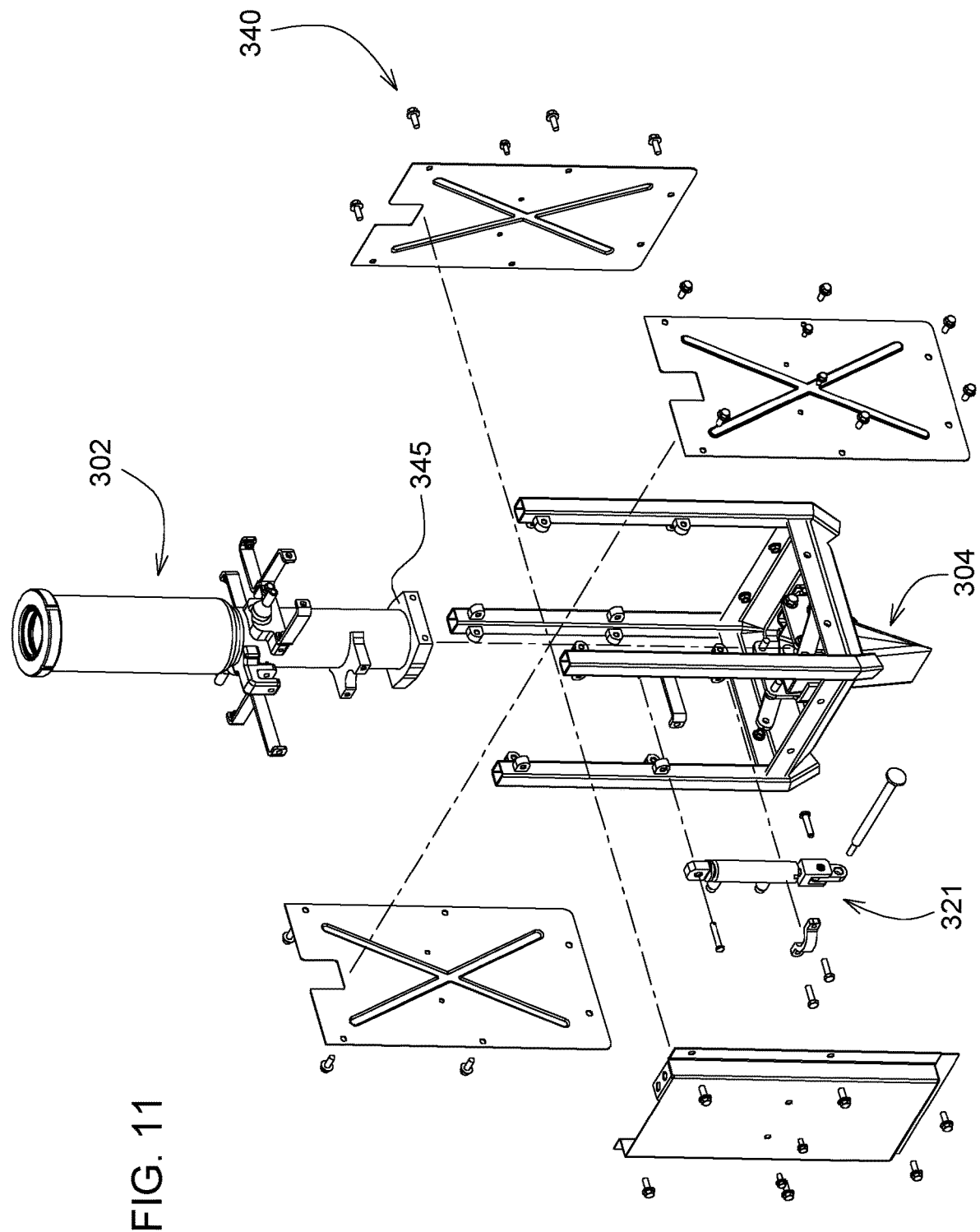
FIG. 11 is an exploded view of a portion of the sapling apparatus.
Figure 14:
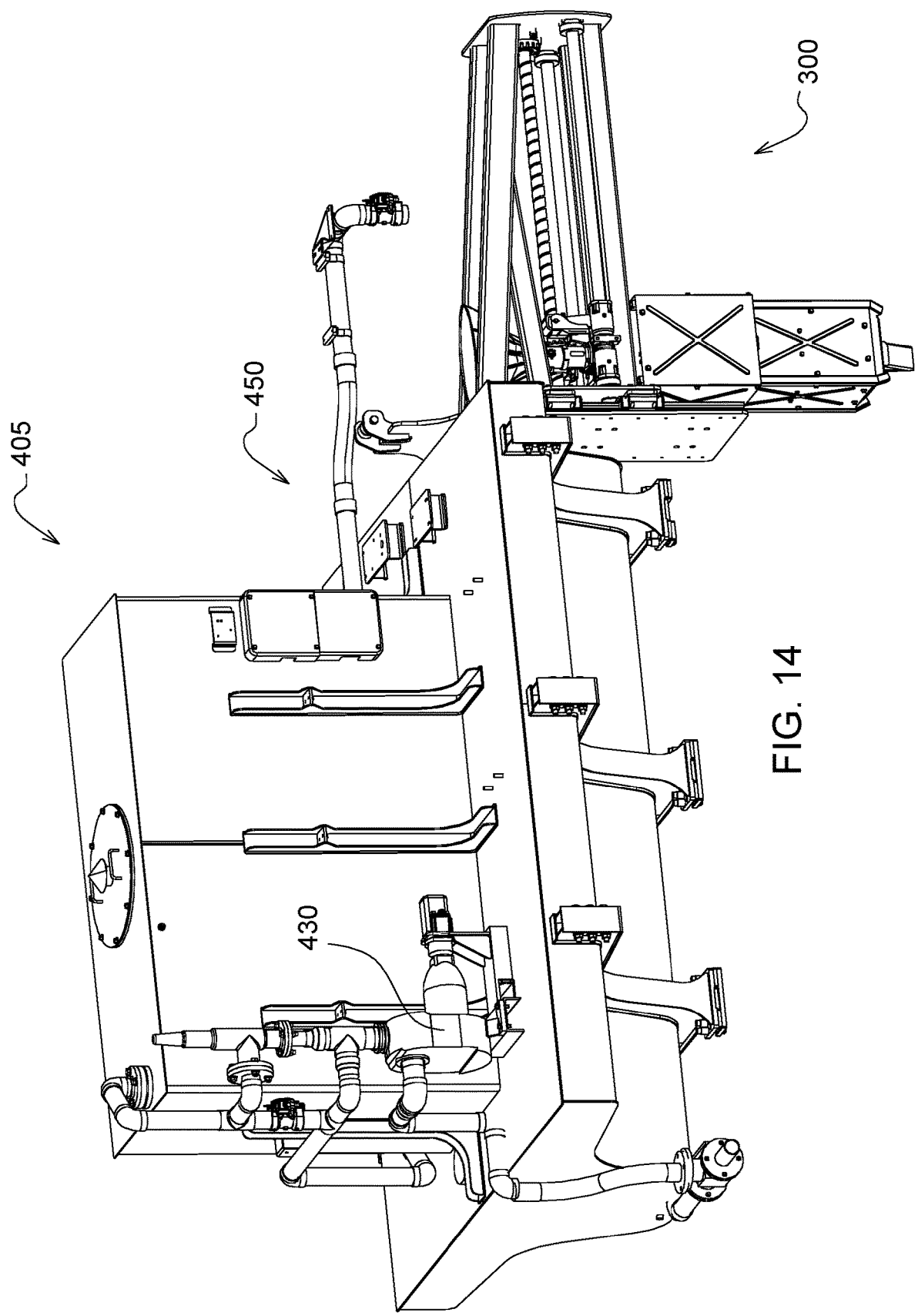
FIG. 14 is an angled side view of the water tank.

FIG. 11 illustrates an exploded view of the tube, detailing an end of tube 345 wherein the end of tube 345 is made of a rigid material. As previously mentioned, the end of tube 345 is configured to penetrate the ground 312 to create a well 350 (shown in FIG. 13D) around the sapling 107 when planting. The well 350 helps retain water and/or fertilizer released from a hydrating fluid storage tank 405 (shown in FIG. 14) within the footprint of the end of tube 345, in addition to compacting the soil disturbed during the planting process.

Now turning to FIG. 14-17 with continued reference to FIG. 2, the planter vehicle 100 comprises a hydrating system to be used during planting, wherein the hydrating fluid is stored in a hydrating fluid storage tank 405. The hydrating fluid storage tank 405 is coupled to the sapling planting apparatus 300 and enables release of a measured quantity of water/fertilizer at specified intervals. This feature may be used when planting a sapling 107, and alternatively may also be used to only water and/or fertilize at predefined locations and/or intervals when not planting. The hydrating fluid storage tank 405 is communicatively coupled to the controller 180, The controller 180 may determine a release pressure of the hydrating fluid 410 for the release valve 450 to hydrate the sapling 107 based at least in part on a target distribution rate 420 of the hydrating fluid 410, wherein the target distribution rate 420 is received via a target distribution rate input signal 425. The controller 180 may then control the supply pressure 427 of the hydrating fluid 410 from a pump 430 to be greater than or substantially equal to the release pressure 435. The controller 180 may further control an unloading valve 440 fluidly disposed between the pump 430 and the hydrating fluid storage tank 405, the unloading valve 440 regulating a maximum supply pressure. The controller 180 may finally control the release valve 450 to provide a first portion of the hydraulic fluid to the release valve 450 at an unloading pressure greater than or equal to the release pressure 435, and to direct a remainder of the hydrating fluid 410 back to the hydrating fluid storage tank 405.

The hydrating fluid (indicated by arrows) may comprise of either water, a hydrogel, a fertilizer, or some mixture thereof.

The input signal may be either electric, pneumatic, or hydraulic.

The target distribution rate may be based at least in part on a target volume. Target volume may be defined as the intended target volume release per sapling 107.

Figure 16:
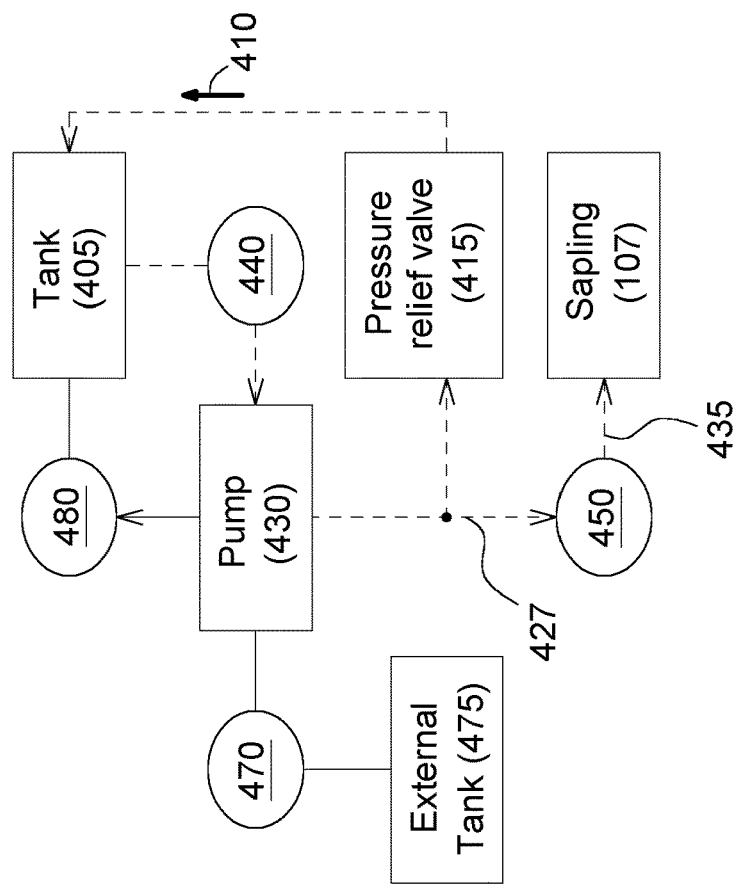
FIG. 16 is a schematic view of the hydrating system identifying supply mode with the dotted lines.
Figure 15:
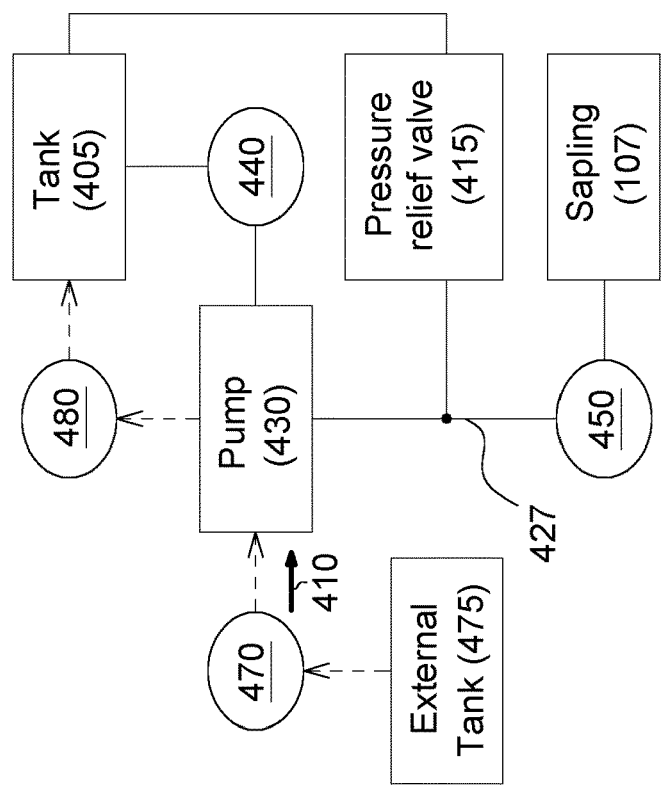
FIG. 15 is a schematic view of the hydrating system identifying refill mode with the dotted lines.

The controller 180 may further determine a function mode for the hydrating fluid storage tank 405 between a refill mode 455 (path designated by the dotted lines in FIG. 15) and a supply mode 460 (path designated by the dotted lines in FIG. 16). The function mode may be received through a function mode signal 465. Selecting the designated function controls an access valve 470 fluidly disposed between the pump 430 and an external water source 475. The access valve 470 may toggle between an open position to fill the hydrating fluid storage tank 405 from an external hydrating fluid source (e.g. lake, reservoir) during refill mode 455, and a closed position to return the hydrating fluid 410 to the supply pressure 427 during the supply mode 460.

The controller 180 may further control a stop loss valve 480 fluidly disposed between the pump 430 and the hydrating fluid storage tank 405. The stop loss valve 480 toggles between a closed position when the function mode is in supply mode 460 and an open position when the function mode is in refill mode 455. The release valve 450 is oriented towards the sapling 107. The input signal for the function mode 465 may be received from a user input interface 485.

FIG. 17 describes the system for a high-efficiency planting system 500 for a work machine as it relates to the planter vehicle 100. The system 500 provides a substantial automation to the silviculture process. As previously mentioned, the system advantageously ensures continuous forward movement of the planter vehicle as it plants. The system 500 comprises a conveying unit 112, an indexing unit 215, a sapling planting unit 300 (also referred to as the sapling planting apparatus), a sensing module 305, and a controller 180.

The conveying unit 112, coupled to the chassis of the work machine 100, is configured to store one or more trays 190 of saplings 107. The conveying unit 112 transports the trays 190 in sequential order towards a gripping unit 205 wherein the gripping unit 205 retrieves at least one sapling 107 (the present embodiment retrieves a row of saplings 217) from the tray 190 and releases the row of saplings 217 to the indexing unit 215.

The indexing unit 215, coupled to the gripping unit 205, receives the row of saplings 217 and individually releases a sapling 107 for planting to the sapling planting unit 300 as the chassis 102 is propelled.

The sapling planting unit 300 is configured to receive the sapling 107 from the indexing unit 215 and delivers the sapling 107 into the ground 312.

A sensing module 305 coupled to a plurality of sensors, is configured to detect a set of parameters defining the delivery of the sapling 107 into the ground 312 and generate data input signals 505 based on the parameters. The controller 180 is configured to receive the data input signals 505 from the sensing module 305. The controller 180 is programmed to provide feedback to one or more of the conveying unit 112, the indexing unit 215, and the sapling planting unit 300 to adjust one or more actuators in response to the data input signals 505. For example, in one exemplary operation, the sensing module 305 detects the level of the ground from a rest position of the sapling planting unit 300. The ground depth detection advantageously enables uniformity in planting depth for the saplings, because the system 500 may adjust the length of extension for the respective actuators (e.g. dig actuator 315 of the sapling planting unit 300 when planting). As this occurs, the controller 180 records and stores the vertical extension of the actuators as the ground depth. The controller may further detect contact with the ground using pressure feedback in the actuators, such as hydraulic pressure. The system 500 may further comprise a vertical displacement sensor 593 configured to generate a vertical displacement input signal 595. The delivery of the sapling 107 into the ground 312 comprises displacement of the sapling in a vertical direction based on the vertical displacement input signal 595. This vertical displacement may be dynamically variable because of irregularities in the ground surface such as bumps, hills, mounds, holes, and other incongruities in the ground 312, and therefore the system 500 actively adjusts the rest position.

In another exemplary operation, the system 500 calculates planter vehicle speed, or displacement of ground traveled over a given time. Based on the planter vehicle speed, the system may derive the required actuator movement of the planting unit 300 from the home position to nullify impact on the sapling 107 as the spade 304 of the planting unit 300 contacts the ground 312. In the sensing module 305, the vehicle speed sensor 109 generates a vehicle speed input signal 108. Delivery of the sapling 107 in the ground 312 comprises displacement of the sapling 107 in a horizontal direction opposite the direction of travel the vehicle 100. The displacement of the sapling 107 in the horizontal direction is equal to a calculated displacement of the planter vehicle based on the vehicle speed input signal 108. This may be monitored by a horizontal displacement sensor 517 configured to generate a horizontal displacement signal 519 to be received by the controller 180. The horizontal displacement may be sensed in one of multiple ways. These include laser proximity sensors, pressure feedback sensors, actuator position sensors, etc.

Furthermore, the sensing module 305 eliminates potential damage of multiple moving components with position/proximity sensors 134, thereby eliminating the possibility of collision between moving components.

The system 500 further comprises a location module 510 coupled to a wireless identification device 515 configured to generate a sapling location signal 520. The controller 180 is further configured to receive the sapling location signal 520 from the location module 510. The controller 180 is programmed to store in memory the sapling location signal 520 in an asset location database 525 such that the asset location database 525 displays known locations of one or more saplings 107. The asset location database 525 may also save other parameters including but not limited to the vertical depth of planting 530, a local time 535, and a data stamp 540, correlating to the sapling location signal 520. The data stamp 540 may comprise of information such as sapling type, nursery source, batch #, operator, and general planting conditions, to name a few.

The system 500 may further comprise a sapling hydrating module 402 coupled to the planting unit 300. The sapling hydrating module 400 is configured to generate a hydrate input signal 550 to control the release valve 450 to provide one or more of water, a hydrogel, and a fertilizer to the sapling 107.

The system may further comprise a monitoring module 555 coupled to one or more of the conveying unit 112, the indexing unit 215, and the planting unit 300. The monitoring module 555 including at least one camera 560 and configured to generate a visual display of one or more the conveying unit 112, the indexing unit 215, and the planting unit 300 on a user input interface 485. The monitoring module 555, enables the operator to see on a screen, for example, when the last tray has been emptied, or when a row of saplings in a tray has been emptied.

The system may further comprise a navigation module 565 coupled to the location module 510. The navigation module 565 coordinates propulsion and steering of the chassis 102 to a pre-planned navigable path 585. The pre-planned navigable path 585 receives input formatted from one or more of a visual line path 575 sensed by a visual device 580 and a pre-programmed path 585 comprising a series of sapling location points. The navigation module 565 may alternatively coordinate steering angle and directional input 596 from a leader work machine, in a leader—follower type configuration. Finally, the navigation module 565 may receive input from the user input interface 485.

The plurality of sensors comprises an obstruction detector sensor 142 configured to generate an obstruction input signal 599 upon sensing an obstruction. The controller 180 may abort planting of the sapling 107 during an operation cycle based on the obstruction input signal 599. An obstruction may comprise of a coppice stump or a hard rock, for example.

Finally, with known planter vehicle speed from the sensing module 305, the planting unit 300 may deliver a sapling 107 into the ground 312 based on a cycle time or distance, thereby determining and recording space between planted sapling in length or speed.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A sapling planting apparatus coupled to a chassis, the chassis including ground-engaging supports to facilitate propelling the chassis, the sapling planting apparatus comprising:
   a screw;
   a nut in threaded engagement with an outer surface of the screw;
   a motor operatively coupled to the screw to rotatably drive the screw, wherein rotation of the screw translates the nut in a first direction;
   a tube configured for delivering a sapling towards a ground, the tube coupled to the nut, the tube telescopically extendable in a second direction from a rest position; and
   a spade configured for penetrating the ground for planting the sapling, the spade coupled to the tube.

2. The sapling planting apparatus of claim 1, wherein translating the nut in a reverse direction, the reverse direction being opposite the first direction, after the tube has begun to telescopically retract in an upward direction towards the rest position.

3. The sapling apparatus of claim 1, wherein the first direction is opposite a direction of travel of the chassis.

4. The sapling apparatus of claim 3, wherein a speed of translating the nut and a speed of travel of the chassis are the same when the spade is in contact with the ground.

5. The sapling planting apparatus of claim 1, wherein an end of the tube comprises a rigid material, the end of the tube configured to penetrate the ground to create a well in the ground when planting.

6. The sapling planting apparatus of claim 1 further comprising a spade actuator operatively coupled to the spade, the spade actuator actuating the spade from an open position to a closed position to released sapling into a ground.

7. The sapling planting apparatus of claim 1 further comprising a dig actuator operatively coupled to the tube, the dig actuator actuating the tube from the rest position to an extended position.

8. The sapling planting apparatus of claim 7 further comprising a scissor mechanism operatively interposed between the dig actuator and the tube, the scissor mechanism comprising at least one pair of relatively movable crossed scissor arms, and a pivot means interconnecting the at least one pair of scissor arms for relative movement of the scissor arms about the pivot axis, wherein actuating the dig actuator actuates the at least one pair of scissor arms to extend, the at least one pair of scissor arms amplifying movement cause by the dig actuator.

9. The sapling planting apparatus of claim 8, wherein the scissor mechanism is enclosed in a housing assembly to environmentally seal the scissor mechanism.

10. The sapling planting apparatus of claim 1, wherein the spade comprises a fixedly attached spade portion and a rotatably attached spade portion, the spade operatively coupled to a spade actuator, the spade actuator rotating open the rotatably attached spade portion thereby placing the sapling in the ground.

11. A work machine for planting a sapling comprising:
   a chassis;
   ground-engaging supports coupled to chassis to facilitate propelling the chassis; and
   a sapling planting apparatus coupled to the chassis, the sapling planting apparatus comprising:
      a screw;
      a nut in threaded engagement with an outer surface of the screw;
      a motor operatively coupled to the screw to rotatably drive the screw wherein rotation of the screw translates the nut in a first direction;
      a tube for delivering a sapling towards a ground, the tube coupled to the nut, the tube telescopically extendable in a downward direction from a rest position, wherein translating the nut in the first direction coincides with extending the tube in a downward direction; and
      a spade for penetrating the ground for planting sapling, the spade coupled to the tube.

12. The work machine for planting a sapling of claim 11, wherein translating the nut in a second direction, the second direction being opposite the first direction, coincides with retracting the tube in an upward direction towards the rest position.

13. The work machine for planting a sapling of claim 11, wherein the first direction is opposite a direction of travel of the chassis.

14. The work machine for planting a sapling of claim 13, wherein a speed of translating the nut and a speed of travel of the chassis are the same when the spade is in contact with the ground.

15. The work machine for planting a sapling of claim 11, wherein an end of tube comprises a rigid material, the end of tube penetrating the ground to create a well in the ground when planting the sapling.

16. The work machine for planting a sapling of claim 11 further comprising a spade actuator operatively coupled to the spade, the spade actuator actuating the spade from an open position to a closed position to release the sapling into the ground.

17. The work machine for planting a sapling of claim 11 further comprising a dig actuator operatively coupled to the tube, the dig actuator actuating the tube from a rest position to an extended position.

18. The work machine for planting a sapling of claim 11 further comprising a scissor mechanism operatively interposed between a dig actuator and the tube, the scissor mechanism comprising at least one pair of relatively movable crossed scissor arms, and a pivot means interconnecting the at least one pair of scissor arms for relative movement of the scissor arms about a pivot axis, wherein actuating the dig actuator actuates the at least one pair of scissor arms to extend, the at least one pair of scissor arms amplifying movement of the dig actuator.

19. The work machine for planting a sapling of claim 18, wherein the scissor mechanism is enclosed in a housing assembly to environmentally seal the scissor mechanism.

20. The work machine for planting the sapling of claim 11, wherein the spade comprises a fixedly attached spade portion and a rotatably attached spade portion, the spade operatively coupled to a spade actuator, the spade actuator rotating open the rotatably attached spade portion thereby placing the sapling in the ground.

\* \* \* \* \*